United States Patent
McConnell et al.

(10) Patent No.: US 6,294,891 B1
(45) Date of Patent: Sep. 25, 2001

(54) SYSTEMS AND METHODS FOR ROBUST VIBRATION SUPPRESSION IN A MOTION CONTROL SYSTEM

(75) Inventors: Kenneth G. McConnell, Ames, IA (US); Chad E. Bouton, Delaware, OH (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 09/190,874

(22) Filed: Nov. 12, 1998

Related U.S. Application Data

(63) Continuation-in-part of application No. 09/303,462, filed on Apr. 30, 1999, now Pat. No. 6,011,373, which is a continuation of application No. 08/912,283, filed on Aug. 15, 1997, now Pat. No. 6,002,232.

(51) Int. Cl.[7] .................................................... G05B 5/01
(52) U.S. Cl. ........................ 318/619; 318/560; 318/561; 318/568.17; 318/568.18; 318/569; 318/636; 700/188; 700/32; 700/38; 700/39; 700/69
(58) Field of Search ................................ 700/188, 32, 38, 700/39, 69, 52, 97, 98, 182; 318/636, 105–110, 440–442, 629, 558, 560–569; 703/1, 14, 18; 702/75–78, 109–113, 115

(56) References Cited

U.S. PATENT DOCUMENTS

| | | | |
|---|---|---|---|
| 4,609,855 | * | 9/1986 | Andrews .............................. 318/561 |
| 4,751,443 | * | 6/1988 | Jackson et al. ................... 318/561 X |
| 4,879,643 | | 11/1989 | Chakravarty et al. . |

(List continued on next page.)

OTHER PUBLICATIONS

Alberts, T. et al., "Dynamic Analysis to Evaluate Viscoelastic Passive Damping Augmentation for the Space Shuttle Remote Manipulator System", *Journal of Dynamic Systems, Measurement, and Control*, 114, pp. 468–475 (Sep. 1992).

D'Amato, E. et al., "Dynamic Modelling of Mobile Flexible Structures for Improvement of Motion Control", *Proceedings of the 12th International Model Analysis Conference*, Ilikai Hotel, Honolulu, Hawaii, pp. 799–805, Jan. 31–Feb. 3, 1994.

(List continued on next page.)

*Primary Examiner*—Robert E. Nappi
*Assistant Examiner*—Tyrone Smith
(74) *Attorney, Agent, or Firm*—Mueting, Raasch & Gebhardt, P.A.

(57) ABSTRACT

Systems and methods for reducing unwanted vibration in motion system are provided using a Robust Vibration Suppression (RVS) methodology, in which acceleration frequency spectra are obtained for each of a number of command input functions developed for moving a load a specified distance within a specified move time interval using an actuator. The frequency spectra comprise peaks, with notches defined between adjacent peaks. A desirable command input function is one with a frequency spectra having either a notch with a maximum width or a peak with a minimum magnitude relative to frequency spectra associated with other command input functions, or, alternatively, a peak with a magnitude of less than or equal to a pre-established magnitude or a frequency notch having a width greater than or equal to a pre-established width. A suitable command input function may be characterized by a ramp function, a cosine function, a sine function, or a combination thereof. The period of a suitable command input function is related to a fundamental natural frequency of the motion control system. A bridge circuit may be employed to reduce motor ripple torque, and a control circuit may be employed to compensate for back EMF. A computer-based system may be used to design, test, and optimize a motion control system using RVS principles. Various system components may be graphically modeled. Command input functions may be applied to the system, modified, and optimized. Various graphical and character data may be displayed. RVS design software may be embodied in a computer-readable article of manufacture.

79 Claims, 28 Drawing Sheets

U.S. PATENT DOCUMENTS

| | | |
|---|---|---|
| 4,897,589 | 1/1990 | Fujiwara et al. . |
| 4,916,635 | 4/1990 | Singer et al. . |
| 5,089,758 | 2/1992 | Sogawa . |
| 5,144,549 | 9/1992 | Youcef-Toumi . |
| 5,164,647 | 11/1992 | Moulds, III . |
| 5,282,130 | 1/1994 | Molnar . |
| 5,305,158 * | 4/1994 | Ueda et al. ................... 318/560 X |
| 5,321,342 | 6/1994 | Kruse . |
| 5,325,247 | 6/1994 | Ehrlich et al. . |
| 5,329,214 | 7/1994 | Williamson et al. . |
| 5,359,409 | 10/1994 | Wildnauer et al. . |
| 5,378,975 | 1/1995 | Schweid et al. . |
| 5,384,506 | 1/1995 | Aoshima . |
| 5,394,071 * | 2/1995 | Thoen ................... 318/610 |
| 5,400,256 | 3/1995 | Beale et al. . |
| 5,406,496 | 4/1995 | Quinn . |
| 5,426,545 | 6/1995 | Sidman et al. . |
| 5,465,035 | 11/1995 | Scaramuzzo, Jr. et al. . |
| 5,465,183 | 11/1995 | Hattori . |
| 5,594,309 | 1/1997 | McConnell et al. . |
| 5,610,848 | 3/1997 | Fowell . |
| 5,638,267 | 6/1997 | Singhose et al. . |
| 5,659,234 | 8/1997 | Cresens . |
| 5,659,468 | 8/1997 | Duss . |
| 5,666,297 | 9/1997 | Britt et al. . |
| 5,726,879 | 3/1998 | Sato . |
| 5,729,111 | 3/1998 | Ogura et al. . |
| 5,736,054 | 4/1998 | Feller et al. . |
| 5,784,272 | 7/1998 | Schootstra et al. . |
| 5,784,273 | 7/1998 | Madhavan . |
| 5,790,404 | 8/1998 | Faye et al. . |
| 5,790,413 | 8/1998 | Bartusiak et al. . |
| 5,800,331 | 9/1998 | Song . |
| 5,825,645 | 10/1998 | Konar et al. . |
| 5,850,339 | 12/1998 | Giles . |
| 5,901,009 | 5/1999 | Sri-Jayantha et al. . |
| 5,912,821 | 6/1999 | Kobayashi . |
| 5,914,829 | 6/1999 | Kadlec et al. . |
| 5,929,700 | 7/1999 | Fuller et al. . |
| 5,963,724 * | 10/1999 | Mantooth et al. ............... 395/500.44 |
| 6,102,958 * | 8/2000 | Meystel et al. ................... 703/2 |

OTHER PUBLICATIONS

Chen, D. et al., "Adaptive Linearization of Hybrid Step Motors: Stability Analysis", *IEEE Transactions on Automatic Control,* 38(6), pp. 874–887 (Jun. 1993).

Title page, copyright page, and table of contents for Kenjo. T. et al., "Stepping Motors and Their Microprocessor Controls"; second edition; Claredon Press; Oxford, England; 1994.

McConnell, K. et al., "Noise and Vibration Control with Robust Vibration Suppression," *Sound and Vibration,* 24–26 (1997).

Sehitoglu, H. et al., "Design of a Trajectory Controller for Industrial Robots Using Bang–Bang and Cycloidal Motion Profiles", ASME Winter Annual Meeting, Anaheim, CA; *Robotics: Theory and Applications,* 3, pp. 169–175 (1986).

Singer, N.C. et al., "Preshaping Command Inputs to Reduce System Vibration", *Journal of Dynamic Systems, Measurement, and Control,* 112, pp. 76–82 (Mar. 1990).

Title page, copyright page, and table of contents for Smith, O.J.M, 1958. *Feedback Control Systems* (*Series in Control System Engineering*). McGraw–Hill Book Company, Inc., New York, NY.

Swigert, C.J., "Shaped Torque Techniques", *J. Guidance and Control,* 3(5), pp. 460–467 (Sep.–Oct. 1980).

Weidenheft, J., "New Technology Battles Noise Created by Hum of Ink–Jet Printers," Iowa State Daily, p. 7, Nov. 14, 1997.

* cited by examiner

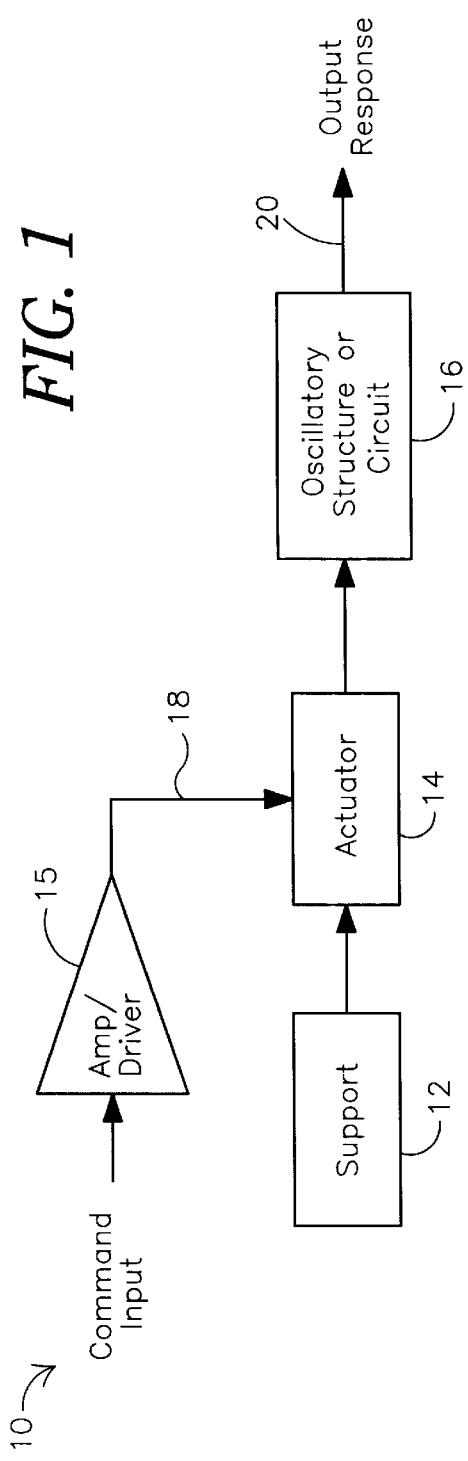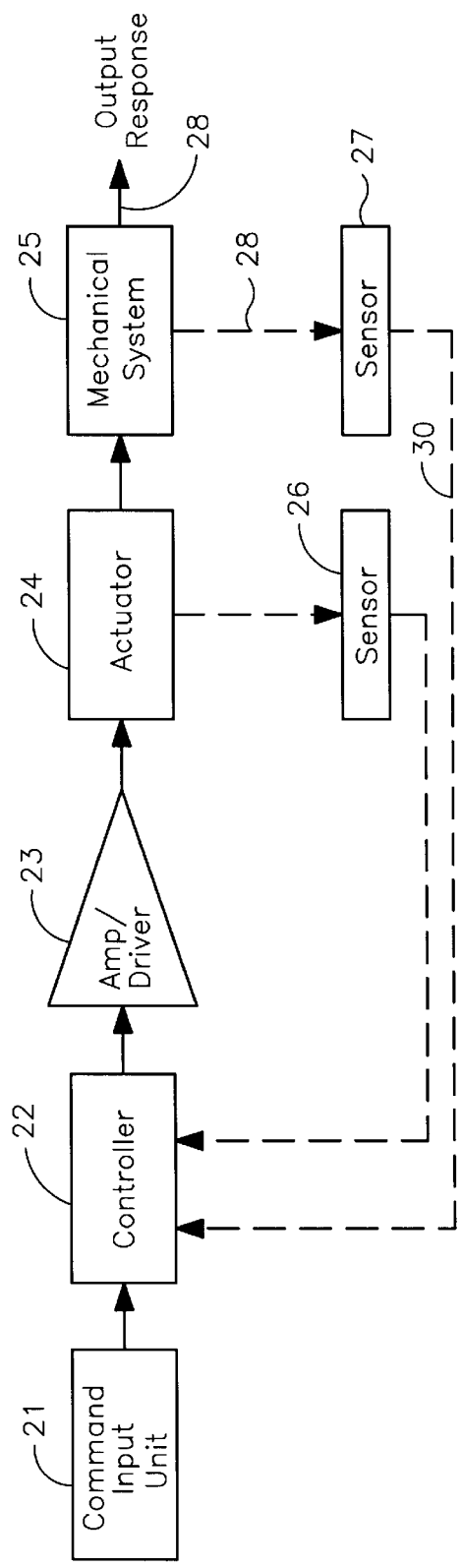

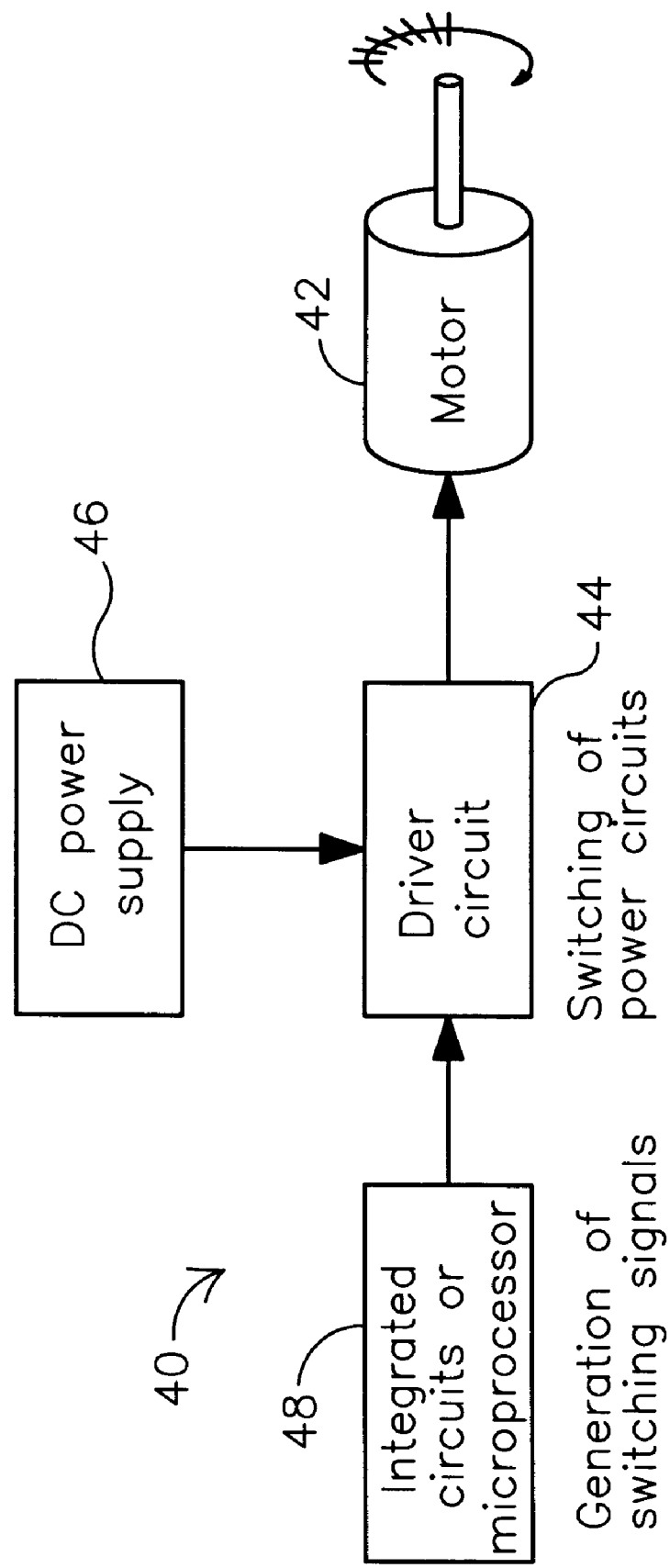

Comparison of Position Errors

Comparison of Position Errors

Comparison of Input Commands

Comparison of Velocities

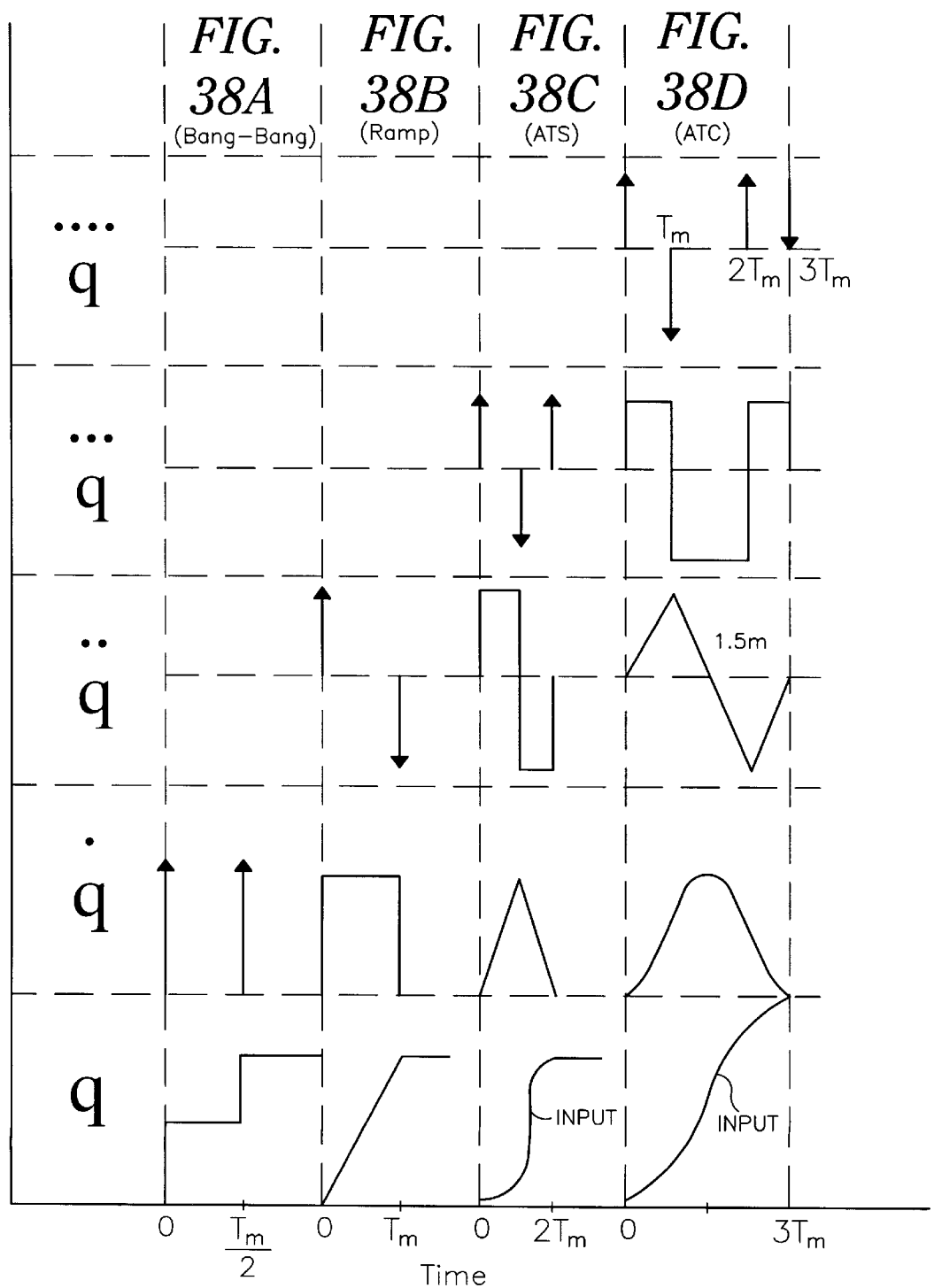

SYSTEMS AND METHODS FOR ROBUST VIBRATION SUPPRESSION IN A MOTION CONTROL SYSTEM

CROSS-REFERENCE TO RELATED APPLICATIONS

This application is a Continuation-in-Part of U.S. Pat. No. 6,011,373 (Ser. No. 09/303,462, filed Apr. 30, 1999 issued Jan. 4, 2000), which is a Continuation of U.S. Pat. No. 6,002,232 (Ser. No. 08/912,283, filed Aug. 15, 1997 issued Dec. 14, 1999). The present application claims the benefit of the above-described patents.

FIELD OF THE INVENTION

The present invention relates generally to systems for controlling a physical system, and more particularly, to systems and methods for suppressing unwanted vibration in a motion control system.

BACKGROUND OF THE INVENTION

Various types of motion systems are routinely employed in the technical fields of robotics, automation, machining, medical imaging, computer disk drives, and a number of other fields of technology. A motion control system employed in such motion systems typically includes a digital or analog controller responsive to command inputs, an amplifier/driver, and a linear or rotary actuator coupled to a mechanical system, such as a mechanical tool or a joint of a robotic arm. A six degree of freedom robot system, for purposes of example, represents a motion system which may comprise a six degree of freedom motion control system, a number of robotic arms and joints, and an end effector, such as a tool or gripper. Motion control systems may be implemented for operation in either an open-loop or closed-loop configuration. In a closed-loop configuration, feedback sensors are generally employed to provide the controller with data concerning the actuator and mechanical system during operation.

A high degree of control is often required in many types of motion systems, as any unintended residual vibration during and upon completion of a prescribed movement effectuated by the system may have deleterious consequences. Undesirable vibration within a motion system employed in a medical imaging system, for example, may result in various types of imperfections in an imaging process. Unacceptable levels of surface roughness, by way of further example, may result from unwanted vibration occurring within a motion system employed in high precision machining equipment.

Undesirable vibration or oscillation is of particular concern in the field of stepper motor technology. By way of example, stepper motors are used in a wide variety of applications that require precise positioning. A typical stepper motor includes 100, 200, or 400 evenly spaced magnetic poles respectively disposed on the rotor and stator of the stepper motor, with a greater number of poles generally being disposed on the stator. A controller is typically employed to pulse the stepper motor in order to advance the rotor by single step increments. The controller provides for accurate positioning of the rotor relative to the stator by coupling current to the field windings of the stator and/or the rotor so as to electromagnetically draw the rotor forward or backward, typically with varying levels of vibration/oscillation, until alignment of the stator and rotor poles is realized.

A typical stepper motor having 200 poles can provide a resolution of 1.8° (¹⁄₂₀₀th of a revolution). Higher levels of resolution may be achieved by employing an inter-pole positioning technique in which currents in the windings of the motor are controlled to define inter-pole positions of the armature. Half-stepping systems, for example, are known to be capable of positioning the armature between adjacent poles. Other known microstepping techniques provide for incremental armature positions at other fractional inter-pole positions.

It is well appreciated in the art that unwanted vibrations or oscillations are of primary concern in many high-precision motion system applications. It is generally desirable to perform a movement using a motion system without residual vibrations when the governing criteria include robustness, minimum move time, and minimum noise. The term "robustness" is generally understood in the art as defining the ability of a system, in response to a command input, to follow a command input with acceptable errors in spite of changes in the system. In the specific case of vibration reduction, robustness is generally understood to define the ability of a system to complete a motion or other output response in response to a command input without excessive residual oscillation or vibration in spite of changes in the fundamental natural frequency of the system. In some applications, it would appear desirable to enhance all of the three above-mentioned characteristics, while in others it may be desirable to focus on only one or two of these characteristics.

A number of techniques have been developed by others in an attempt to reduce undesirable vibrations or oscillations associated with movement of a motor in a motion system. Although many of these previous approaches would appear to provide a measure of unwanted vibration reduction, such techniques often fail to provide the requisite level of robustness required in many applications. Further, many of the previously developed techniques are incapable of accommodating changes in the fundamental natural frequency of the system. Moreover, proposed solutions in the prior art generally ignore the contribution to unwanted residual vibrations made by discrete components of a motion system, and instead only consider the vibration characteristics of the bulk motor structure.

Other more subtle phenomena associated with motion systems are often ignored by conventional motion control schemes. By way of example, prior art approaches to reducing unwanted residual vibration in motor movement often fail to adequately account for ripple torque, which often results in an increase in residual vibration, when attempting to provide an acceptable level of robustness. Other characteristics impacting motion control system performance, such as back EMF effects, may also be inadequately addressed by prior art control schemes without compromising robustness of the system.

There exists a need for methods and systems that can provide robust command inputs which can be used to improve the performance of a motion system, such as DC and stepper motor systems, in terms of robustness, noise, and/or speed as is desired by the designer. There exists a further need for a motion control strategy for systems employing motors, such as DC and stepper motors, that addresses undesirable affects of ripple torque and back EMF without comprising system robustness. The present invention fulfills these and other needs.

SUMMARY OF THE INVENTION

The present invention is directed to systems and methods for reducing vibrations/oscillations robustly in a motion system. In accordance with an embodiment of the present invention, a Robust Vibration Suppression (RVS) methodology is employed in a motion control system to generate command inputs that provide for improved robustness characteristics. A method of controlling an actuator, such as a linear or rotary motor, of a motion control system according to this embodiment involves obtaining acceleration frequency spectra for each of a number of command input functions developed for effecting movement in a motion system within a specified move time interval using the actuator. The frequency spectra comprise a series of peaks, with notches defined between adjacent peaks. The method further involves selecting a command input function with a frequency spectra having either a notch with a maximum width or a peak with a minimum magnitude relative to frequency spectra associated with other command input functions. The selected command input function is applied to the actuator so as to cause the actuator to effect movement in the motion system by a specified distance within a specified move time interval.

The period of the selected command input function is preferably related to a fundamental natural frequency of the motion system. A motion system typically exhibits a fundamental natural period, $T_n$, and the selected command input function is preferably one that has a period of between approximately $1.5T_n$ and approximately $3T_n$. The notch with the maximum width is preferably one of the first five frequency notches in the respective frequency spectra, and more preferably, the first frequency notch in the respective frequency spectra. The peak with the minimum magnitude is preferably either a first peak or a second peak in the respective frequency spectra. The selected command input function may be characterized by a ramp function, a cosine function or a sine function, or any combination of ramp, cosine, and sine functions, for example.

A method of developing a command input function for an actuator of a motion control system according to another embodiment of the present invention involves developing an acceleration profile for moving a load within predetermined displacement and move time limits using the actuator. A frequency spectra of the acceleration profile preferably has either a peak with a magnitude of less than or equal to a pre-established magnitude or a notch, defined between adjacent peaks, having a width greater than or equal to a pre-established width. A command input function is obtained using the acceleration profile, and applied to the actuator so as to cause the actuator to move the load within the predetermined displacement and move time limits.

The pre-established magnitude may be established as a minimum magnitude of frequency spectra associated with a number of acceleration profiles developed for moving the load within the predetermined displacement and move time limits. The pre-established notch width may be established as a maximum width of notches in frequency spectra associated with a number of acceleration profiles developed for moving the load within the predetermined displacement and move time limits. The method according to this embodiment may further involve verifying that the magnitude of an actual acceleration frequency spectra associated with application of the command input function to the actuator is less than or equal to the pre-established magnitude or the width of the notch of the actual acceleration frequency spectra is greater than or equal to the pre-established width. Further, the predetermined displacement and move time limits associated with relative movement between the load and the actuator may be selected.

In accordance with another embodiment of the present invention, a method of developing a command input function for controlling an actuator of a motion control system using a computer system involves displaying a graphical representation of a base structure, a stator structure, and a rotor structure of a motor, and a structure to be driven by the motor. One or more properties of the base structure, the stator structure, the rotor structure, and the driven structure are characterized, such as dynamic and structural properties. An acceleration frequency spectra is obtained for each of a number of command input functions developed for moving the driven structure within specified displacement and move time limits using the motor. A command input function with a frequency spectra having either a notch with a maximum width or a peak with a minimum magnitude relative to frequency spectra associated with other ones of the plurality of command input functions may be selected. The selected command input function may be applied to the motor, and simulation of relative movement between the driven structure and the motor in response to the selected command input function may be presented.

The method according this embodiment may further involve modifying the selected command input function, applying the modified selected command input function to the motor, and simulating movement of the driven structure relative to the motor in response to the modified selected command input function. Simulating movement of the driven structure relative to the motor may involve simulating the movement graphically or in terms of numerical data. The displacement and move time limits may be modified as desired. One or more of the properties of the base structure, the stator structure, the rotor structure, or the driven structure may also be modified.

Various output may be displayed, such as a graphical representation of the frequency spectra associated with the selected command input function or the frequency spectra associated with one or more of the various command input functions. Position errors associated with one or more of the plurality of command input functions may also be graphically presented. Other graphical output may include a graphical representation of velocity profiles, acceleration profiles or excitation time profiles associated with one or more command input functions. A computer readable medium tangibly embodying a program executable for developing a command input function for an actuator of a motion control system is also provided.

In accordance with yet another embodiment of the present invention, a motion control system includes a motor, a structure coupled to the motor, and a controller and amplifier coupled to the motor. The controller applies a selected command input function to the motor so as to cause the motor to move the structure within specified displacement and move time limits. The selected command input function has associated with it a frequency spectra having either a peak with a magnitude of less than or equal to a pre-established magnitude or a notch, defined between two adjacent peaks, having a width greater than a pre-established width. In one embodiment, the motor is driven by a first coil and a second coil, and the controller is coupled to a bridge circuit for controlling the motor with reduced ripple torque. In another embodiment, the controller is coupled to a control circuit for compensating for back EMF.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 1 is a schematic diagram of a motion control system in which command inputs determined by the methods and/or control systems according to the present invention may be applied;

FIG. 2 is a schematic diagram of a motion control system for developing an optimal command input according to the methods of the present invention;

FIG. 3A is a system block diagram illustrating various components of a motion control system employing a stepper motor in accordance with an embodiment of the present invention;

FIGS. 19B–22 are illustrations of a base, stator, rotor, and driven structure useful for modeling the dynamics of a DC or stepper motor employed in a motion control system in accordance with an embodiment of the present invention;

FIGS. 38A–38D graphically illustrate a first class of preshape functions generated by impulses at ascending derivative levels;

Figure 3B:
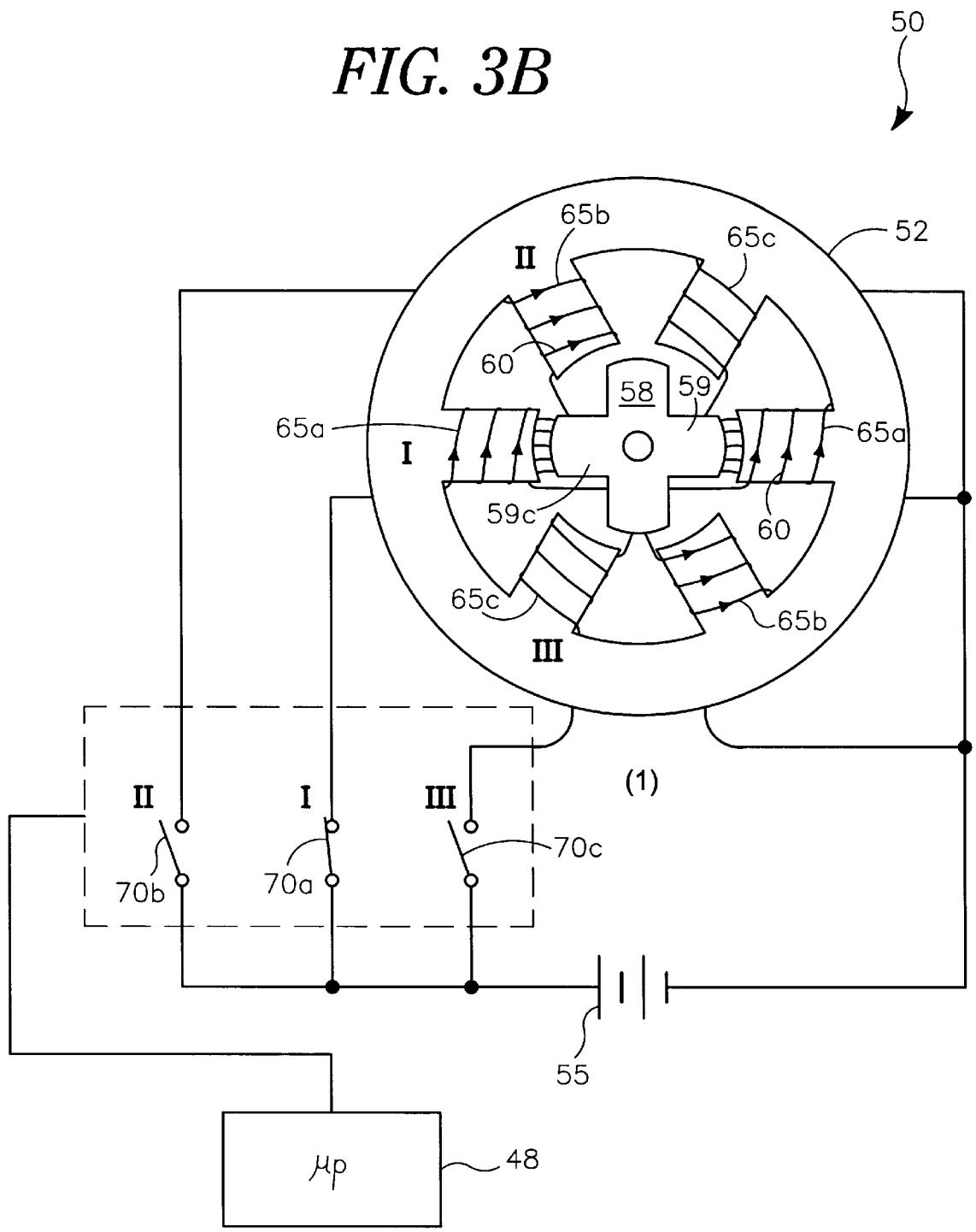
FIG. 3B is a detailed illustration of the stepper motor shown in FIG. 3A.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the spirit and scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

The systems and methods according to the present invention reduce unwanted vibrations in motion systems and provide for improved robustness characteristics in the presence of changes to system characteristics. In general, the motion control system methodologies described herein may be effectively implemented in a wide variety of motion control systems, including open or closed-loop systems, oscillatory motion control systems, multiple axis robots, medical imaging systems, or even a motion system employing a single actuator, such as a linear or rotary DC or stepper motor, for example.

As discussed above, "robustness" is the ability of the system to complete a motion or other output response without excessive residual vibration in spite of changes in natural frequencies of the system. Robustness can also be expressed in terms of a "robustness function" which is a plot of the maximum residual vibration response that occurs at the end of a preshape command, i.e., after a preshape move time ($T_r$) as a function of $T_n$ or normalized form of $T_r/T_n$, where $T_n$ represents the period of the fundamental natural frequency of the system. As a result, it can be seen that the fundamental natural frequency of a system, and its fundamental natural period $T_n$, often controls the robustness function because the largest overshoots are often dominated by this lowest natural frequency term.

In a typical motion control system, including a motion control system employing a conventional DC motor or stepper motor for example, three characteristics must generally be balanced. One characteristic is robustness. Another characteristic is the response time, i.e., the time required to complete a move which is either the command input period or a function of the command input period. Response time is important in many applications and is typically easier to minimize in systems that show little change in natural frequency during system operation or aging. Noise is another characteristic that can be significantly affected by the command input used to control moves in a system. Noise can be generated by the supporting structure, as well as the structure being moved, and is typically directly associated with the frequency content of the torque and/or force applied to the structural system.

Balancing robustness, response time, and noise generally requires design trade-offs. For example, improving robustness typically requires a sacrifice in response time. Similarly, minimizing noise generation may also require a sacrifice in response time. The present invention includes methodologies for characterizing the dynamics of a motion control system and structural dynamics, and for developing command inputs that offer improved robustness.

Although the methods and systems disclosed herein are generally described within the context of a motion control system employing a DC or stepper motor, the many advantages offered by the present invention may be realized in a wide range of physical systems, including mechanical (e.g., cam or mechanism generated motion), electrical (e.g., voltage input to an oscillatory circuit), electromechanical (e.g., a robotic manipulator), imaging, and hydraulic or fluid-based systems, for example, in which a command input is used to obtain a desired system output response. These physical systems may be categorized as oscillatory in nature, in that the output response can result in residual vibration or oscillation at the end of the command input period. The oscillatory nature of such physical systems can, however, be controlled through the application of robust command inputs that reduce unwanted residual motion at the end of the command input period. Furthermore, the methods and systems of the present invention may be implemented in any suitable form including hardware, software, and combinations of hardware and software, as well as in physical forms such as cam mechanisms, etc.

Referring now to the Figures, and more particularly to FIG. 1, there is illustrated a schematic representation of a physical system 10 in which command inputs developed in accordance with the methods and systems according to the present invention may find application. The physical system 10 includes an actuator 14 acting on an oscillatory structure or circuit 16. The physical system 10 may include an actuator base or support 12 which may itself be oscillatory in nature. The actuator 14, which receives a command input 18 via an amplifier/driver 15, acts on the oscillatory structure or circuit 16 in response to the command input 18. The result of the actuator 14 acting on the oscillatory structure or circuit 16 in response to command input 18 results in an output response 20 from the oscillatory structure or circuit 16.

Assuming that a given oscillatory system possesses a fundamental natural period ($T_n$), various basic command inputs may be processed by the approaches described herein to synthesize new command inputs with improved robustness. In one embodiment, the methods and systems according to the present invention involve modeling the structural elements of a physical system, such as a stepper motor, characterizing the elements/system dynamics, and developing a command input to achieve a desired balance of robustness, move time, and noise. In a further embodiment, a computer-based design tool may be employed to model a given physical system, characterize component and system dynamics, and optimize command inputs to achieve desired performance characteristics.

The system depicted in FIG. 2 includes a motion control system comprising a controller 22, amplifier/driver 23, and actuator 24, the actuator 24 shown coupled to a mechanical system 25. In a closed-loop configuration, the motion control system may further include one or more sensors, such as sensors 26 and 27, disposed within the system to provide feedback information to controller 22 respectively derived from the actuator 24 and mechanical system 25. A command input unit 21 is coupled to controller 22 and generates command inputs that are input to the controller 22 and actuator 24 via amplifier/driver 23. Output responses 28 at various locations in the mechanical system 25 are generated in response to the command inputs. In a closed-loop configuration, a feedback loop (shown in dashed lines), which includes sensor 27, is used to monitor the output responses 28 of one or more locations in mechanical system 25 and provides a feedback signal 30 to controller 22. The sensor 27, in one embodiment, measures the output responses 28 to established criteria to determine whether an adjustment is to be made by the controller 22, such as by adjusting a command input to obtain a different output response 28 from the mechanical system 25 in response to the adjusted command input.

The sensors 26, 27 and associated feedback loops may take many different forms. In more automated systems, the feedback loop may automatically monitor output responses 28 for a variety of factors such as response time, noise generation, and/or residual motion/vibration. By way of example, if the output response 28 falls outside of a desired range for one or more of those characteristics as determined by sensor 27, a feedback signal 30 can be transmitted to the controller 22 to cause a change to the command input and, ideally, cause the output response 28 from the mechanical system 25 to fall within the desired ranges for those factors. The controller 22 may take the form of a computational device such as a computer, microprocessor, or digital signal processor (DSP), and the comparing of actual to desired output responses may be implemented in hardware, software or a combination thereof.

It is understood that a controller of a motion control system according to the present invention may be embodied in hardware (chip-based or otherwise), software, or a combination of hardware and software. Further, the controller may be implemented in a digital technology, an analog technology, or a combination of digital and analog technologies. The details of implementing the actual motion control systems employing the concepts of the present invention will be known to those skilled in the art.

In general, the efficacy of a particular command input applied to a physical system, such as a computer floppy disk drive employing a stepper motor, is typically predicated on the character of the frequency spectra associated with given command inputs and the oscillatory characteristics of the physical system. The present invention provides methods and systems that capitalize on the information provided in the acceleration frequency spectra for a given command input. In many systems, the second derivative curve is indicative of acceleration as will be understood by those skilled in the art, and as a result, the frequency spectra curve provided by the Fourier Transform will generally be referred to as the acceleration frequency spectra curve or profile.

There are also two additional ways to determine the acceleration frequency spectra. For example, the Fourier Transform of the position command function can be multiplied by $(j\omega)^2$ to obtain the acceleration frequency spectra of the command input. Alternatively, the Fourier Transform of the velocity signal corresponding to the command input can be multiplied by $(j\omega)$ to obtain the acceleration frequency spectra of the command input. As a result, the methods according to the present invention typically involve performing a Fourier Transform to obtain the acceleration frequency spectra of a given command input, although any other method of obtaining the acceleration frequency spectra of a given command input should be considered as coming within the scope of the present invention, such as the use of look-up tables for example.

An acceleration frequency spectra curve may be used to determine the robustness and potential for noise generation of any given command input. If those characteristics are acceptable, the command input may be applied to a physical system. If they are not acceptable, based on an analysis of the acceleration frequency spectra for the command input, then another command input may be selected and evaluated. One can compare and/or modify various command input functions in the acceleration frequency spectra domain in order to determine which command input function is most suitable for a given application or purpose. One approach to developing an appropriate command input for a given physical system involves appreciating the relationship between robustness and notch width of the acceleration frequency spectra curve, where notch width is expressed in terms of the frequency ratio $f/f_n$ and the magnitude of the largest local peak in the acceleration frequency spectra curve. This approach will be described below in greater detail in connection with FIGS. 32–36.

Referring now to FIGS. 3A–3B, there is illustrated a block diagram of a conventional DC motor and control system that is generally representative of a motion control system within which the principles of the present invention may be practiced. The system 40 includes a DC motor 42, such as a variable-reluctance or stepper motor, which is actuated under the control of a driver circuit 44. The driver circuit 44 cooperates with a DC power supply 46 to regulate the power delivered to the motor 42 in a manner controlled by a microprocessor 48. In general, the microprocessor 48 generates various switching signals that are transmitted to the driver circuit 44. The driver circuit 44, in response to the switching signals, regulates the power delivered to the motor 42 so as to control the motor as dictated by the control strategy implemented by the microprocessor 48.

With further reference to FIG. 3B, the stepper motor 50, which is shown in generalized form as motor 42 in FIG. 3A, includes a stator 52, a rotor 58, three switches 70a, 70b, 70c, and a DC power source 55. The stepper motor 50 shown in FIG. 3B is provided to illustrate an environment suitable for implementing the principles of the present invention, and is not to be construed as limiting the applicability of the invention in other oscillatory systems. The stator 52 includes six poles or teeth 60, and the rotor 58 includes four poles 59. Three sets of windings 65a, 65b, 65c are arranged such that each set of windings is connected in series to the DC power source 55 through a respective switch 70a, 70b, 70c. Each set of windings 65a, 65b, 65c is often termed a "phase," with the stepper motor 50 illustrated in FIG. 3B constituting a 3-phase motor.

Electrical current is supplied by the DC power source 55 to the windings 65a, 65b, 65c through coordinated switching of switches 70a, 70b, 70c, respectively. The rotor 58 is rotated through a fixed angle, which is termed the step angle, by selectively energizing and de-energizing the phases I, II, III in response to switching signals produced by the microprocessor 48. The angular position of the rotor 58 may thus be controlled in units of the step angle by the switching process effected by the microprocessor 48.

By way of example, when current supplied by the DC power source 55 is applied to the windings 60a through switch 70a, a magnetic flux is produced in the air-gap between the winding set 60a and the rotor teeth 59 which results in a temporary state of equilibrium. When switch 70b is closed so as to excite phase II, together with an excited phase I, magnetic flux is built up at the stator poles 60 and a counter-clockwise torque is created resulting in a counter-clockwise rotation of the rotor 58.

Figure 4:
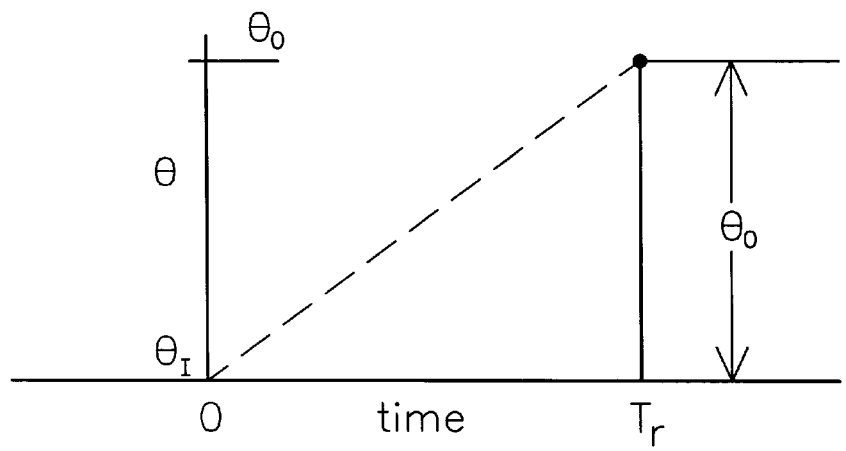
FIG. 4 is graphical depiction of desired motor movement between an initial location and a destination location during a specified time duration, a command input for effecting the desired movement being developed in accordance with the principles of the present invention.

As was described previously in the Background, a number of control techniques have been developed to optimize the movement of a stepper motor so as to minimize residual oscillation or vibration of the motor and/or load structure that may occur after completing a desired movement. With reference to FIG. 4, there is illustrated in graphical form a relationship between time and displacement applicable to a typical motor movement. In particular, it is desired that the motor move from an initial location, $\theta_1$, to an end location, $\theta_0$, during a specified time interval, $T_r$. The principles of the present invention may be applied to ascertain an appropriate command input in order to optimize movement of the stepper motor between positions $\theta_1$ and $\theta_0$ during the time interval $T_r$ in a manner consistent with the objectives of properly balancing the characteristics of robustness, move time, and noise.

A known technique termed ramping, for example, is often employed as a command input in an attempt to improve the movement of a stepper motor between start and end locations, such as is illustrated in FIG. 4. A generalized form of a typical ramping command input function appropriate for effecting such a move is given by:

$$\theta_S(t) = \frac{\theta_0}{T_r} t \quad 0 < t < T_r \quad [1]$$

$$= \theta_0 \quad t > T_r \quad [2]$$

where, $\theta_S(t)$ defines a straight line, which represents a linear ramp command input profile. The velocity profile derived from the linear ramp command input profile is given by:

$$v_s(t) = \theta_0/T_r \quad 0 < t < T_r \quad [3]$$

$$= 0 \quad t < 0 \text{ and } t > T_r \quad [4]$$

where, $v_s(t)$ represents a constant velocity. The corresponding acceleration profile becomes two Dirac delta functions as is given by:

$$a(t) = \left(\frac{\theta_0}{T_r}\right)[\delta(t) - \delta(t - T_r)] \quad [5]$$

Figure 5:
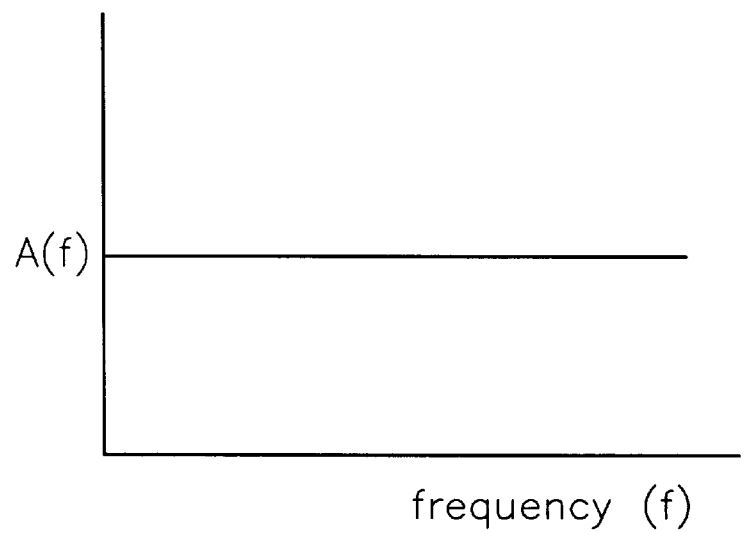
FIG. 5 is a graphical illustration of the frequency spectra associated with a conventional linear or ramp command input.

A frequency analysis of the acceleration profile characterized above in Equation [5] demonstrates nearly flat characteristics, as is shown in FIG. 5. It is noted that the y-axis of the graph in FIG. 5 represents the Fourier Transform (FT) of the acceleration profile (i.e., A(f)=FT(a(t)).

Turning now to FIGS. 6–11, there is illustrated various graphical representations which characterize two command profiles associated with a robust vibration suppression methodology in accordance with the principles of the present invention. An appropriate command input profile well-suited for controlling a DC motor, and more particularly a stepper motor, is one that controls the excitation potential for that command signal. Stepper motor excitation, for example, has been found to be directly related to the acceleration time history resulting from the second time derivative of the command profile. The two robust vibration suppression (RVS) profiles discussed below in connection with FIGS. 6–11 are termed OMC (One Minus Cosine) and RMS (Ramp Minus Sine). These profiles have been developed to address vibration suppression associated with stepper motor movement when a relatively large range of motion is implicated. It is understood that the OMC and RMS command input functions may be advantageously employed in a wide variety of motion control systems, and are not limited to use only in connection with DC or stepper motor control systems.

Figure 6:
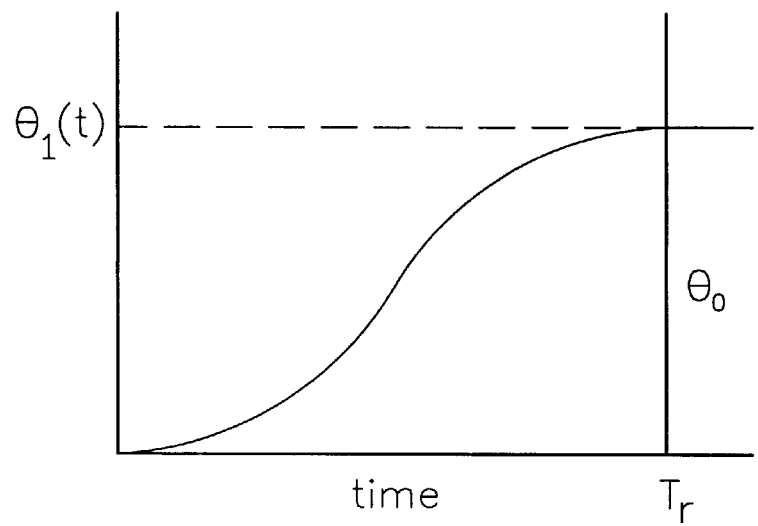
FIG. 6 is a graphical illustration of a robust vibration suppression command input profile, referred to as OMC (One Minus Cosine), which is well-suited for controlling a motion control system in accordance with an embodiment of the present invention.

In accordance with one embodiment of the present invention, and with reference to FIG. 6, the OMC command input profile is given by the following equation:

$$\theta_1(t) = \frac{\theta_0}{2}(1 - \cos(\omega_1 t)) \quad [6]$$

where $$\omega_1 = \pi/T_r \quad [7]$$

The term $\theta_0$ represents the desired magnitude of displacement, $\omega_1$ represents the command frequency term, and $\theta_1(t)$ represents the OMC command input profile. The graphical representation of the OMC command profile is illustrated in FIG. 6, where $T_r$ represents the time interval associated with the displacement of the motor from $\theta=\theta_1=0$ to $\theta=\theta_0$. The velocity profile, $v_1(t)$, associated with the OMC command input profile characterized in Equations [6]–[7] is given by:

$$v_1(t) = \left(\frac{\theta_0 \omega_1}{2}\right)\sin(\omega_1 t) \quad [8]$$

Figure 7:
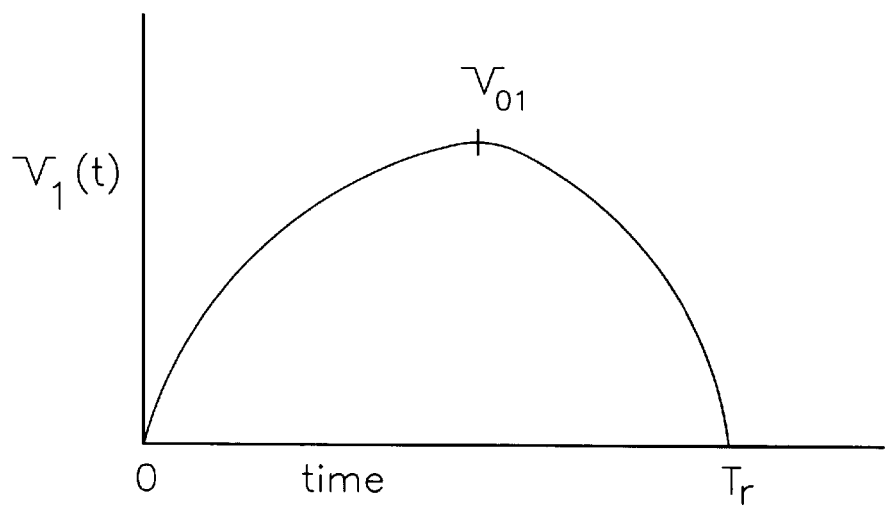
FIG. 7 is a graphical illustration of the velocity profile associated with the OMC command input depicted in FIG. 6.

The velocity profile characterized in Equation [8] is depicted in graphical form in FIG. 7. The acceleration profile associated with the velocity profile defined in Equation [8] is given as:

$$a_1(t) = \left(\frac{\theta_0 \omega_1^2}{2}\right)\cos(\omega_1 t) \quad [9]$$

Figure 8:
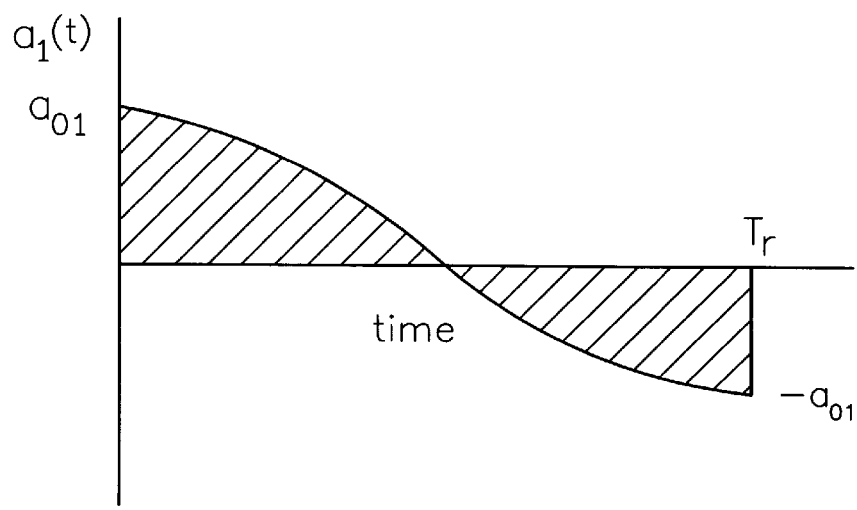
FIG. 8 is a graphical illustration of the acceleration profile associated with the OMC command input depicted in FIG. 6.

This acceleration profile is depicted in FIG. 8. It can be seen that the maximum velocity, $v_{01}$, associated with the velocity profile illustrated in FIG. 7 may be defined as:

$$v_{01} = \frac{\theta_0 \pi}{2T_r} = \left(\frac{\theta_0}{T_r}\right)\left(\frac{\pi}{2}\right) = 1.57 v_a \quad [10]$$

where, the average velocity, $v_a$, is given by:

$$v_a = \frac{\theta_0}{T_r} \quad [11]$$

The maximum acceleration associated with the OMC command profile is graphically illustrated in FIG. 8 and is given by the following equation:

$$a_{01} = \frac{v_a}{T_r}\left(\frac{\pi^2}{2}\right) = 4.935 \frac{v_a}{T_r} \quad [12]$$

The second RVS command input profile, referred to as RMS, is given by:

$$\theta_2(t) = \frac{\theta_0}{T_r}\left[t - \frac{\sin(\omega_2 t)}{\omega_2}\right] \quad [13]$$

$$\text{where } \omega_2 = \frac{2\pi}{T_r} \quad [14]$$

Figure 9:
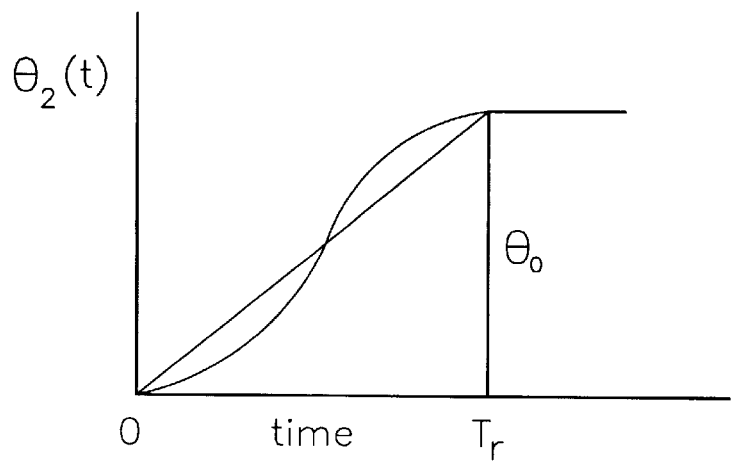
FIG. 9 is a graphical illustration of a robust vibration suppression command input profile, referred to as RMS (Ramp Minus Sine), which is well-suited for controlling a motion control system in accordance with another embodiment of the present invention.
Figure 10:
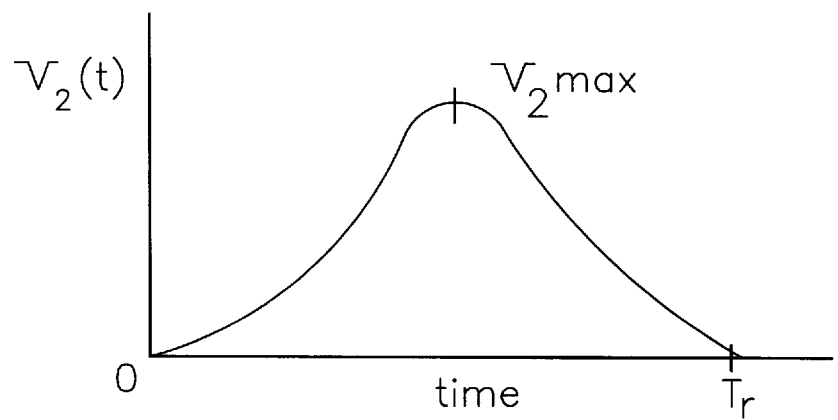
FIG. 10 is a graphical illustration of the velocity profile associated with the RMS command input depicted in FIG. 9.

A graphical representation of the RMS command input profile is provided in FIG. 9. The corresponding velocity profile is illustrated in FIG. 10 and is given by the following equation:

$$v_2(t) = v_a(1 - \cos \omega_2 t) \quad [15]$$

The maximum velocity associated with the RMS command input profile is given by:

$$v_{2max} = 2v_a \quad [16]$$

Figure 11:
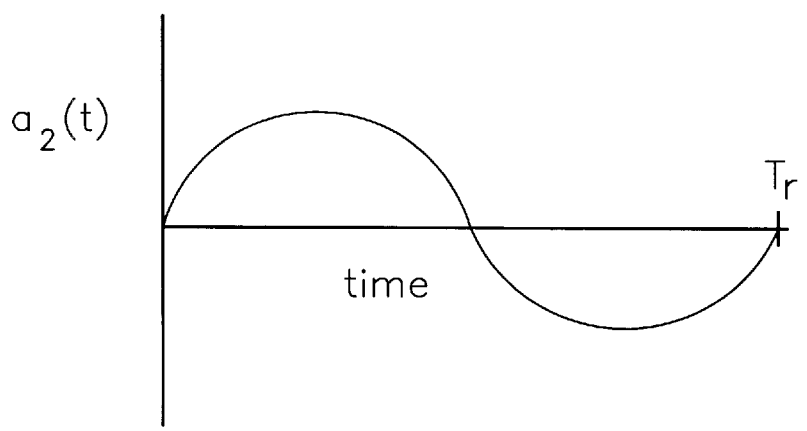
FIG. 11 is a graphical illustration of the acceleration profile associated with the RMS command input depicted in FIG. 9.

The associated acceleration profile is illustrated in FIG. 11 and is given by the following equation:

$$a_2(t) = v_a \omega_2 \sin(\omega_2 t) \quad [17]$$

The maximum acceleration associated with the RMS command input profile is given by:

$$a_{02} = v_a \omega_2 = \left(\frac{\theta_0}{T_r}\right)\frac{2\pi}{T_r} = \left(\frac{v_a}{T_r}\right)2\pi = \left(\frac{v_a}{T_r}\right)6.28 \quad [18]$$

The acceleration profile associated with the RMS command input profile represents a single sine function. The frequency content of this acceleration profile is significantly less than that associated with the OMC command input profile. In particular, the acceleration profile associated with the RMS command input profile does not include any sudden changes in the acceleration curve as is the case at both time t=0 and at time t=$T_r$, associated with the acceleration profile of the OMC command input profile. Table 1 below provides a comparison of the maximum velocity and acceleration associated with each of the OMC and RMS command input profiles.

TABLE 1

| Quantity | OMC | RMS | RMS/OMC |
| --- | --- | --- | --- |
| Max. velocity | 1.57 $v_a$ | 2 $v_a$ | 27.4% higher |
| Max. acceleration | 4.94 $v_a/T_r$ | 6.28 $v_a/T_r$ | 27.1% higher |

Referring now to FIGS. 12–16, there is provided various graphical illustrations that demonstrate the substantial improvement in vibration suppression associated with the use of the above-defined OMC and RMS command input functions in comparison to a linear ramp command input function associated with conventional stepper motor control schemes. The frequency spectra for each of these functions (i.e., ramp, OMC, and RMS) were calculated and plotted in FIGS. 12–16 for a 48 ms duration move of 180°, and a fundamental natural frequency of $f_n$=100 Hz for the stepper motor.

Figure 12:
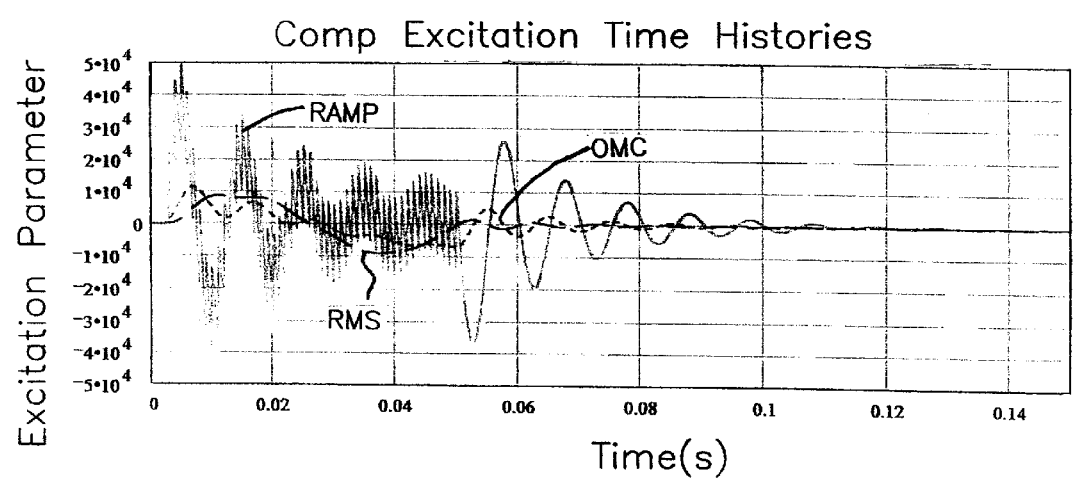
FIGS. 12–14 are graphical illustrations of a time history, frequency spectra, and positional error plot associated with a ramp, OMC, and RMS command input profile, respectively, ignoring the impact of ripple torque.
Figure 13:
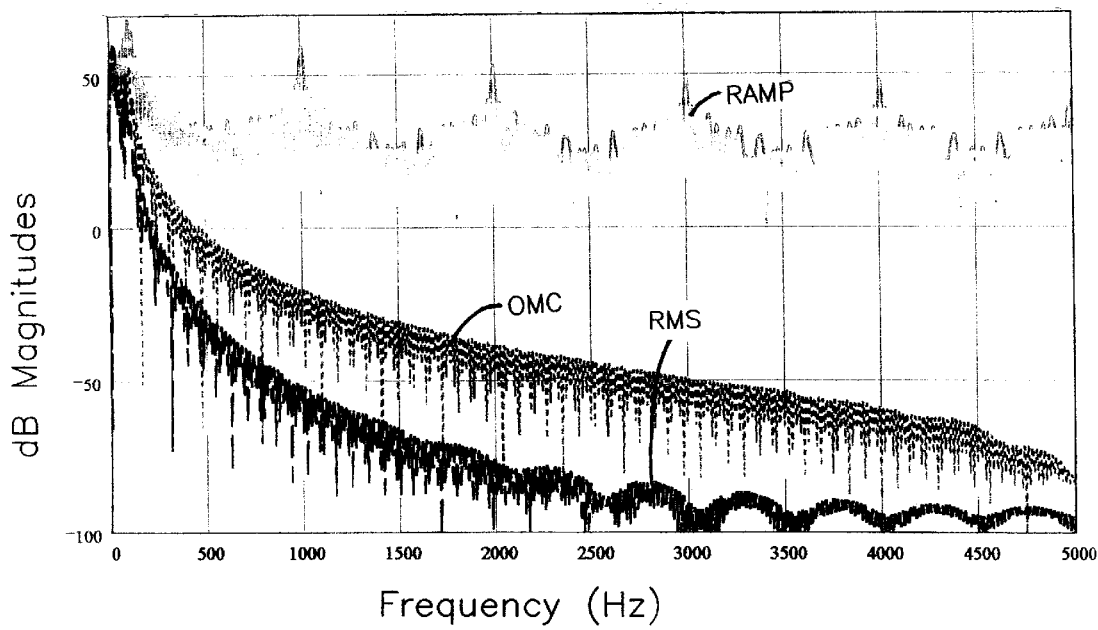
Figure 14:
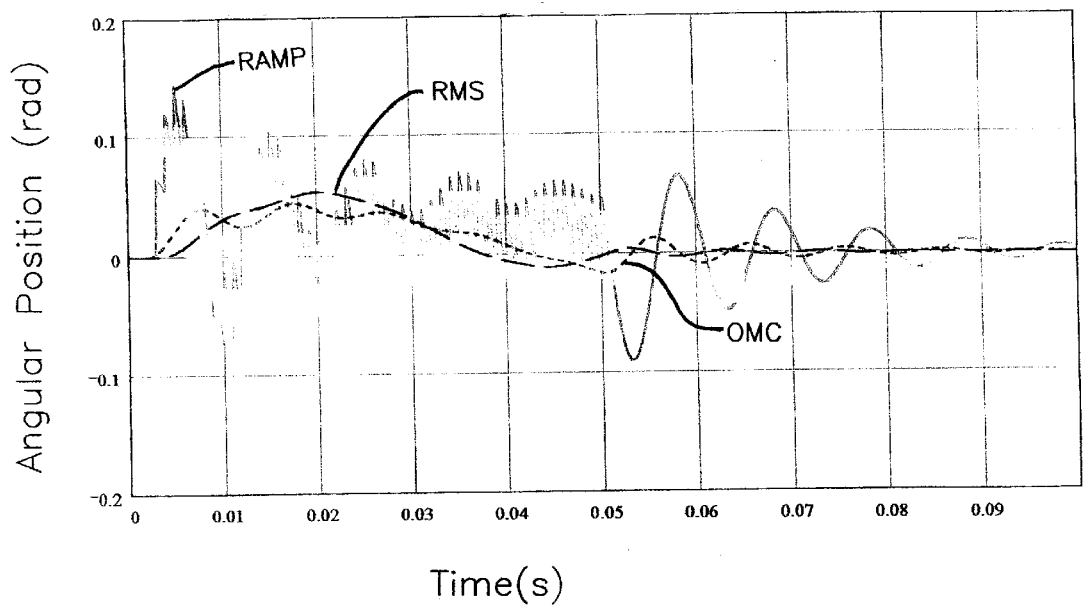

It is noted that in FIGS. 12–16, the OMC command input function is depicted as a short dashed-line, while the RMS command input function is denoted by an alternating short and long dashed-line. The profiles illustrated in FIGS. 12–14 were produced through simulation assuming the absence of any ripple torque (i.e., β=0, where β is the amount of ripple torque as a percentage of the maximum torque). FIGS. 12–14 demonstrate improved excitation and position error characteristics associated with the OMC and RMS command input functions in contrast to the poorer performing conventional ramp command input function.

Figure 15:
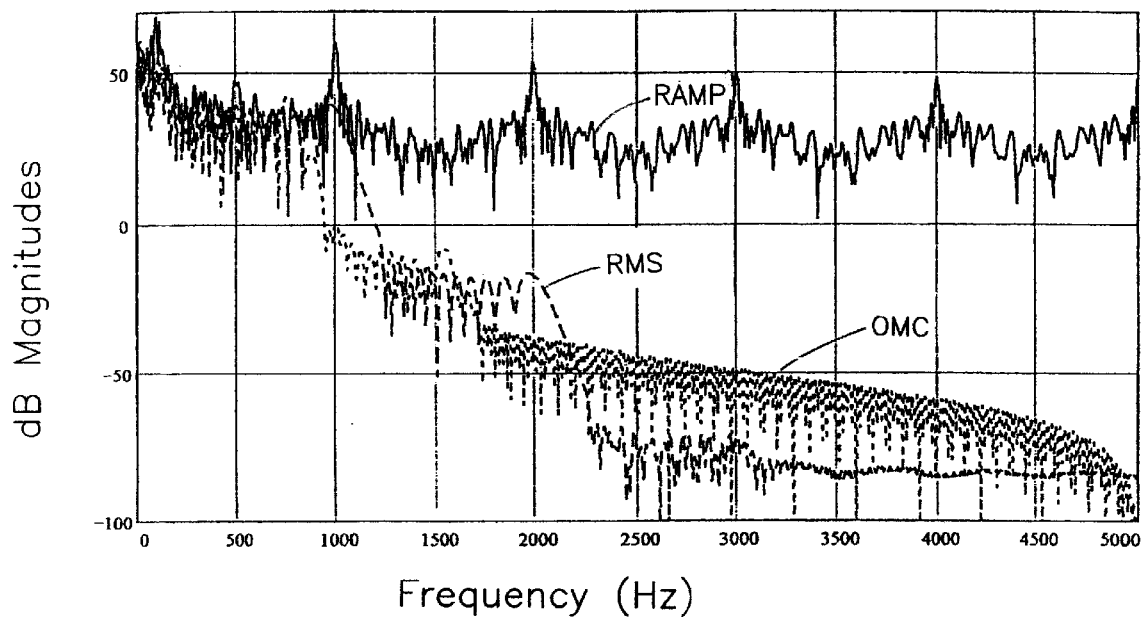
FIGS. 15–16 are frequency spectra and position error plots equivalent to those shown in FIGS. 13 and 14 but with the addition of 10% ripple torque.
Figure 16:
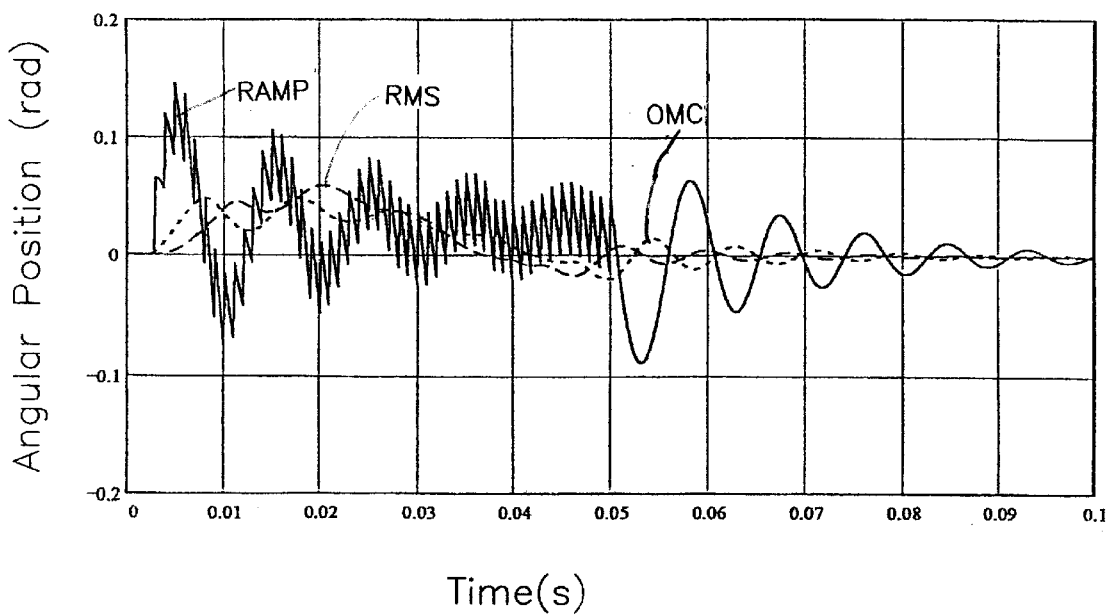

The graphs provided in FIGS. 15–16 were developed using the same constraints as those used to produce FIGS. 13–14 with the exception of a 10% ripple torque (i.e., β=0.1) being introduced. It can be seen from FIGS. 15–16 that the addition of the 10% ripple torque causes a concomitant increase in the frequency spectra in the 0–1,000 Hz and 1,000–2,000 Hz frequency ranges. Accordingly, it is important to reduce ripple torque to below appreciable levels.

As was previously mentioned, the command input profile controls the excitation potential for that command signal, and stepper motor excitation is directly related to the acceleration time history derived from the second time derivative of the command input profile. In accordance with one embodiment of the present invention, the two RVS command input profiles described previously, namely, the OMC and RMS profiles, have acceleration profiles that are given by:

$$a_1(t) = 4.94\left(\frac{\theta_0}{T_r^2}\right)\cos(\omega_1 t) \quad [19]$$

$$a_2(t) = 6.28\left(\frac{\theta_0}{T_r^2}\right)\sin(\omega_2 t) \quad [20]$$

where, $\omega_1 = \pi/T_r$, $\omega_2 = 2\pi/T_r$, $T_r$ is the move time, and $\theta_0$ is the size of the move.

Figure 17:
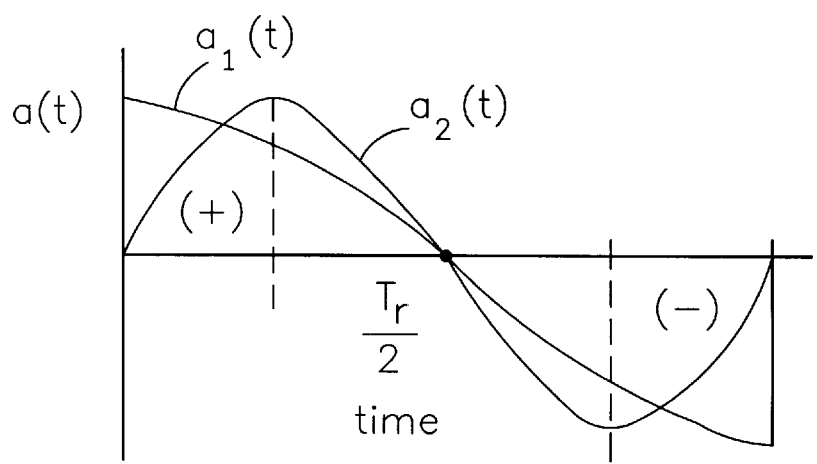
FIG. 17 is a graphical representation of the OMC and RMS acceleration profiles illustrated respectively in FIGS. 8 and 11 superimposed on the same set of axes.

FIG. 17 is an illustration of the OMC and RMS acceleration time profiles superimposed on the same time axis. It can be seen that the OMC and RMS acceleration profiles shown in FIG. 17 are symmetrical, with equal areas above and below the time axis. It can further be seen that computing the integral of the acceleration profiles recited above in Equations [19] and [20] provide for a zero final velocity at a time t=$T_r$.

Figure 18A:
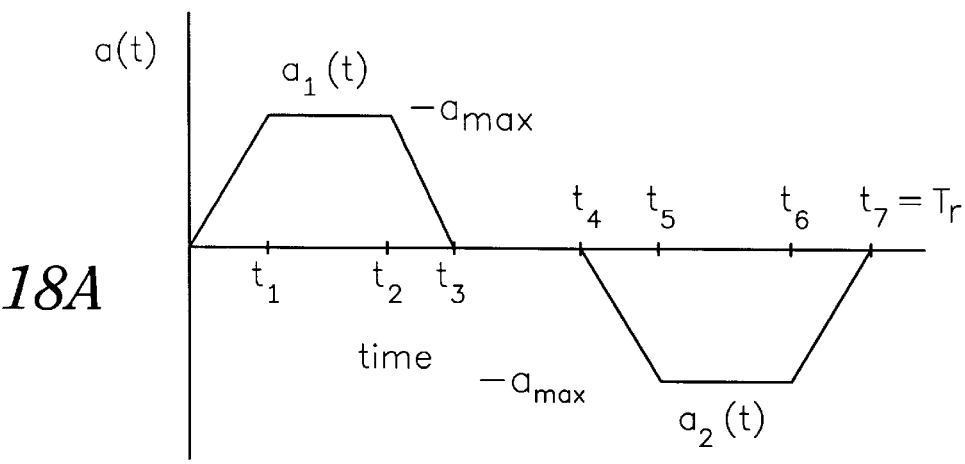
FIGS. 18A–18C respectively illustrate acceleration, velocity, and displacement time histories associated with a command input profile appropriate for a motion control system.
Figure 18B:
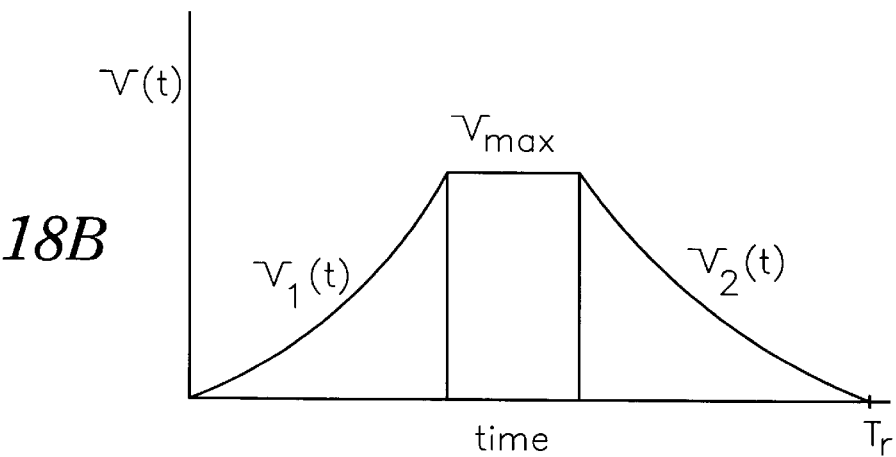
Figure 18C:
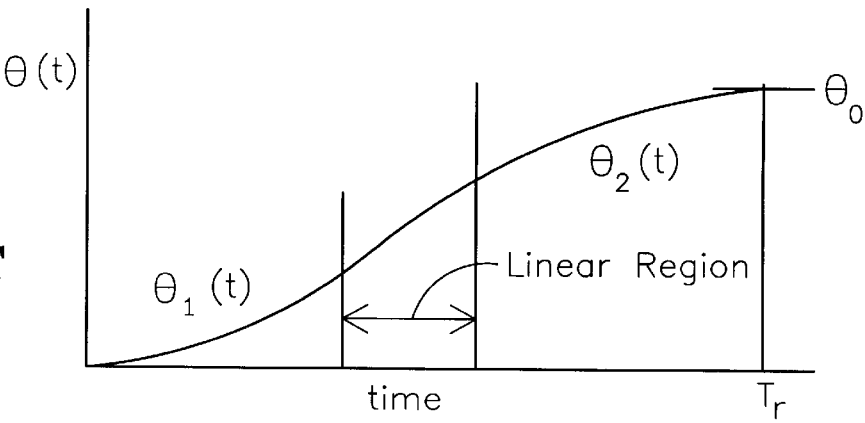

A given DC motor and/or stepper motor typically operates within specified limits of maximum torque and maximum velocity. As such, a general acceleration time history may be developed and employed to reduce excitation in view of these maximum operating constraints. Such a time history may be characterized in the manner illustrated in FIG. 18A. The acceleration time history, a(t), shown in FIG. 18A includes acceleration time histories $a_1(t)$ and $a_2(t)$. In particular, the acceleration time history, a(t), begins and ends at zero acceleration, with a gradual transition occurring over time periods (0 to $t_1$), ($t_2$ to $t_3$), ($t_4$ to $t_5$), and ($t_6$ to $t_7$) so that jerks are minimized. The acceleration time history is limited by maximum motor torque (i.e., $a_{max}=(T_{max}-T_{load})/J$). Further, the acceleration time history, a(t), should provide for the quickest change in velocity. A velocity time history and command input function associated with the acceleration time history, a(t), depicted in FIG. 18A are respectively shown in FIGS. 18B and 18C.

Another important aspect of the present invention concerns the realization by the inventors of the similarity or duality between a DC motion control system and a closed-loop servo motion control system. The realization that a DC motor or a stepper motor can be modeled using servo modeling principles provides the opportunity to characterize the dynamics and response of discrete motor components, as well as the entire motor at a system level, and evaluate the output response of the motor when subject to various command input profiles. Using the design procedures discussed hereinbelow, optimal command input profiles may be readily developed and refined for a given motor configuration and its particular application. Moreover, modifications to motor components and performance may be evaluated using the design approach described below. Further, a computer-based design tool may be employed which automates the design process through implementation of the below-described modeling principles. It will be appreciated that the design procedures described herein may be employed when designing and optimizing many other types of motion control systems, and are not limited to use only in connection with the design of DC and stepper motors.

In the context of DC and stepper motor motion control systems, for example, an initial step in the overall design procedure involves determining the dynamic characteristics of the motor and the load which is acted upon by the motor. In general, the motor characteristics of particular interest include motor torque, inertia, damping, speed, and load characteristics. The load characteristics of particular interest include load inertia, damping, and natural frequencies. Other characteristics of interest include the maximum intended displacement of the load and the relevant time constraints, such as load move times.

After characterizing the motor and load structures, the next step in the overall design procedure involves determining an appropriate acceleration time history for the motor and load system. In general, it has been determined by the inventors that a desirable acceleration time history should provide for a high degree of equivalency between (1) the motor velocity during the initial start time and a time of maximum acceleration and (2) the velocity between the time of maximum acceleration and the movement termination time. In graphical terms, this equivalency of velocities can be seen as equal areas under the velocity curves (see FIG. 18B, for example). Further, when developing an appropriate acceleration time history, one must stay within motor and application limits.

Importantly, an appropriate acceleration time history is one that provides for a command input function (i.e., preshape) that minimizes the frequency content. It is important to recognize that any time history can be used that satisfies the above-mentioned general design requirements. The previously described command input functions, OMC and RMS, represent exemplary command input profiles that satisfy these general guidelines. In short, it is considered desirable that the frequency analysis of the acceleration time history have the lowest possible frequency spectra.

Having developed an appropriate acceleration time history based on applicable motor and load characteristics, a suitable acceleration time history may be integrated in order to obtain the associated velocity time history. The velocity time history, in turn, may be integrated in order to obtain the associated command input function, $\theta(t)$. The command input function, $\theta(t)$, may then be applied to the dynamic model in order to verify that the actual system behaves in the intended manner. The frequency spectra of the dynamic model may be obtained and used to fine-tune the command input function, $\theta(t)$. By way of example, graphical information similar to that shown in FIGS. 12–16 may be developed to optimize the command input function, $\theta(t)$.

The above-described design procedure allows a designer to compare different possible acceleration profiles for their potential to cause noise and vibration, since the basic acceleration frequency spectra has been found to provide a direct measure of the excitation potential of any command function. The actual excitation potential is typically modified by the motor, load, and support structure. However, the overall design procedure described herein provides a useful guide for developing an optimum command input function. The RMS command input function, for example, has been determined to be a useful command input function for a DC motor, but provides for higher velocities which may be of concern in velocity limited applications.

Figure 19A:
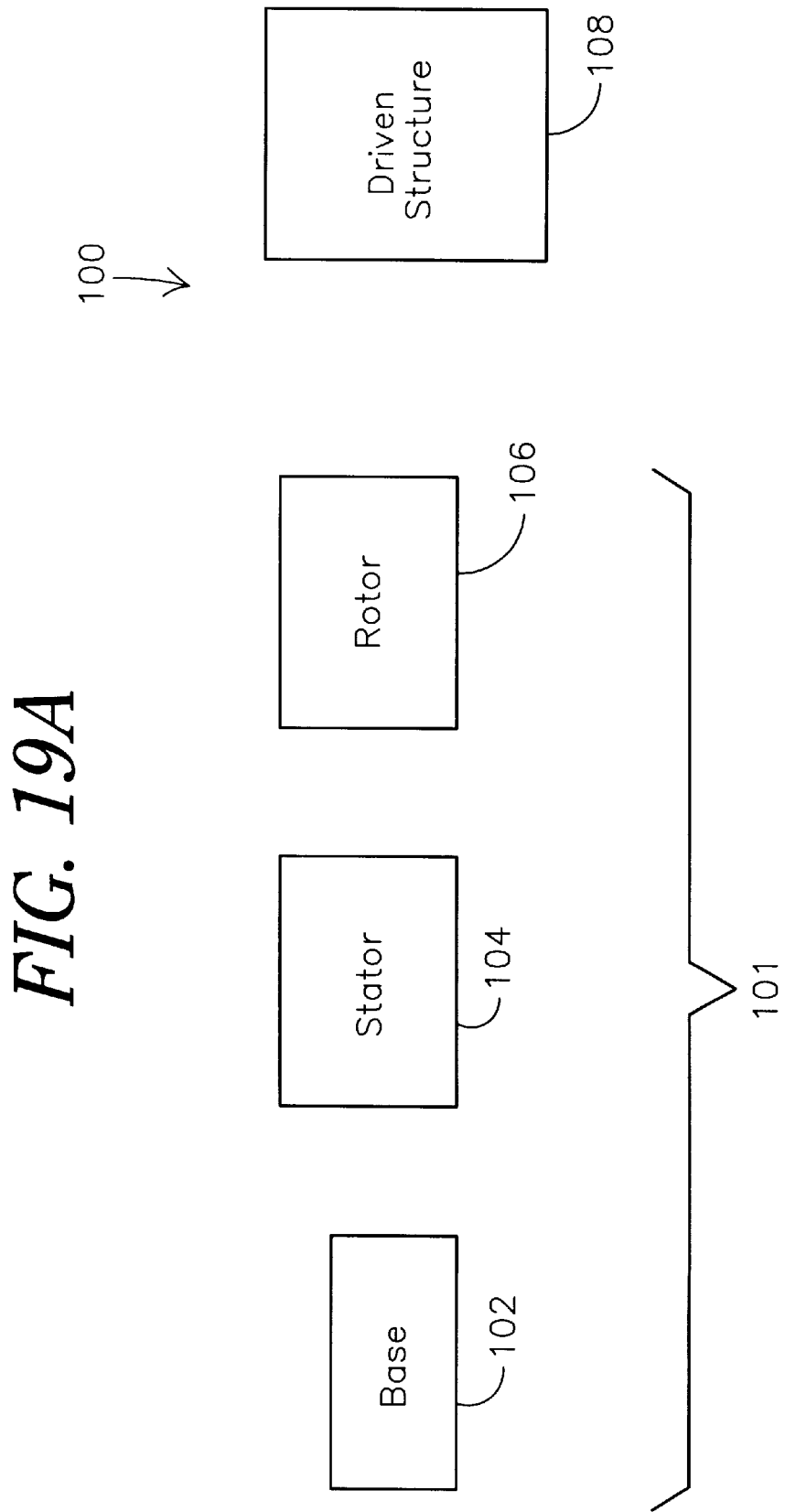
FIG. 19A illustrates in block diagram form various structural elements constituting a DC motor or stepper motor employed in a motion control system in accordance with an embodiment of the present invention.
Figure 19B:
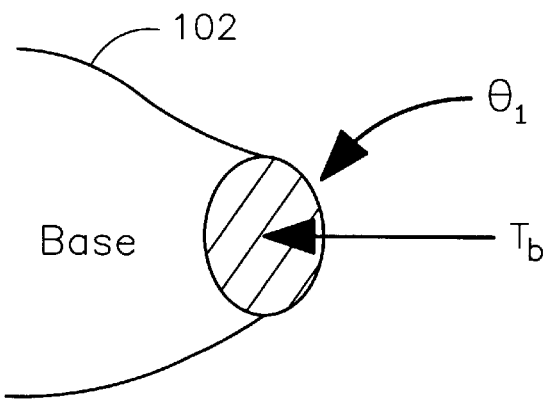

As was previously mentioned, the inventors have determined that a DC or stepper motor may be modeled using servo modeling principles. Other motion control systems may also be modeled and analyzed using such principles. An overall motor model may thus be developed by modeling individual components of the motor. In FIG. 19A, there is illustrated a system block diagram of a motion system 100, such as a system employing a DC or stepper motor, which is depicted as including four primary structures. The DC or stepper motor 101 depicted in FIG. 19A includes a base structure 102, a stator structure 104, and a rotor structure 106. The motion system 100 further includes a driven structure 108, which represents a structural element that is to be moved by the DC or stepper motor 101, such as a load. FIG. 19B is a depiction of the base structure 102 in terms of its dynamic properties.

The base 102 may be modeled as a flexible multiple degree of freedom structure that is subject to a torque, $T_b$, and a response rotation, $\theta_1$, in the direction indicated. The base 102 may thus be modeled using the following equations:

$$\theta_1 = -B(s)T_b \quad [21a]$$

$$B(s) = -\frac{\theta_1}{T_b} \quad [21b]$$

where, B(s) represents the base driving point receptance.

Figure 20:
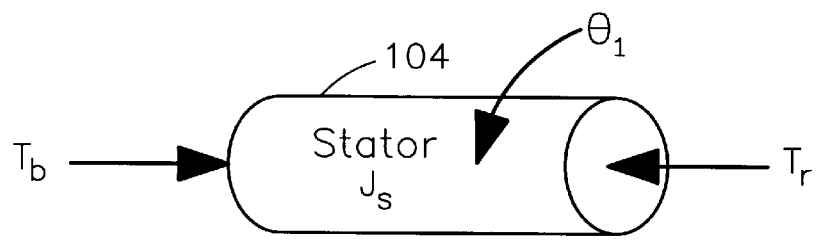

The stator 104, which is depicted in FIG. 20, may be modeled as a rigid mass having an angular inertia of $J_S$. The stator 104 is depicted as being subject to a torque, $T_b$, having a direction oriented opposite to that of the base structure 102. The term $T_r$ represents the magnetic interaction torque that occurs due to magnetic interaction with the rotor 106. The parameter $\theta_1$ represents the rotation of the stator 104, which is the same rotation experienced by the base structure 102. The stator 104 may thus be modeled using the following equations:

$$T_b - T_r = J_S s^2 \theta_1 \quad [22]$$

$$\theta_1 = \left[\frac{-B(s)}{1 + B(s)J_S s^2}\right] T_r \quad [23]$$

Combining Equations [22] and [23] above results in the following equation which characterizes the magnetic interaction torque, $T_r$:

$$T_r = -\left[\frac{1 + B(s)J_S s^2}{B(s)}\right]\theta_1 \quad [24]$$

Figure 21:
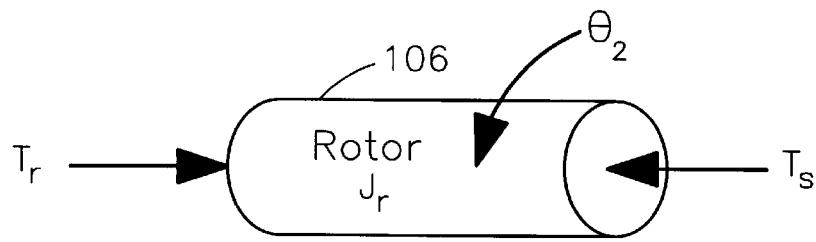

The rotor 106 may be modeled as a rigid mass having an inertia, $J_r$, as is shown in FIG. 21. The torque $T_r$ represents the magnetic torque interaction with the stator 104, while the torque $T_s$ represents the driven structural input torque. The parameter $\theta_2$ represents the rotor motion. The rotor 106 may thus be characterized using the following equation:

$$T_r - T_s = J_r s^2 \theta_2 \quad [25]$$

Figure 22:
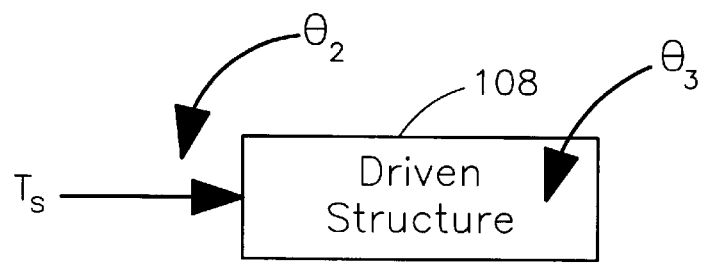

The driven structure 108, which represents the structural element moved by the motor 101, is depicted in FIG. 22. The driven structure 108 may be characterized as having driving point and transfer receptances defined by the following equations:

$$\theta_2 = H_{22}(s)T_S \quad [26]$$

$$\theta_3 = H_{32}(s)T_S \quad [27]$$

$$\theta_3 = T_{32}(s)\theta_2 \quad [28]$$

$$T_{32}(s) = \frac{H_{32}(s)}{H_{22}(s)} \quad [29]$$

where, $\theta_2$ represents the rotor motion, $\theta_3$ represents the output motion, $H_{22}(s)$ represents the driving point receptance, $H_{32}(s)$ represents the transfer receptance, and $T_{32}(s)$ represents the transmissibility ratio. Equations [25] and [26] may be combined as follows:

$$T_r = \left[\frac{1 + H_{22}(s)J_r s^2}{H_{22}(s)}\right]\theta_2 \quad [30]$$

$$\theta_2 = \left[\frac{H_{22}(s)}{1 + H_{22}(s)J_r s^2}\right]T_r \quad [31]$$

$$T_n = T_r - T_s = J_r s^2 \theta_2 \quad [31b]$$

where, $T_n$ represents the net torque to drive the rotor motion.

In developing a system block diagram for a stepper motor, it is useful to combine the above-recited equations to provide the following equations:

$$T_r = K(\theta_c - (\theta_2 - \theta_1)) \quad [32]$$

$$\Delta\theta = \theta_2 - \theta_1 \quad [33]$$

where, $\Delta\theta$ represents the relative motion between the rotor 106 and the stator 104. Equation [32], which is generally applicable for DC motors, is valid for stepper motors so long as $\theta_c - \Delta\theta$ is small, such that $\sin(\theta_c - \Delta\theta) \approx \theta_c - \Delta\theta$ for required linearization, and there is sufficient voltage to overcome motor back EMF. Combining Equations [23], [28], [31], [31b], and [32], a system block diagram of a stepper motor structure may be obtained, such as that illustrated in FIG. 23.

Figure 23:
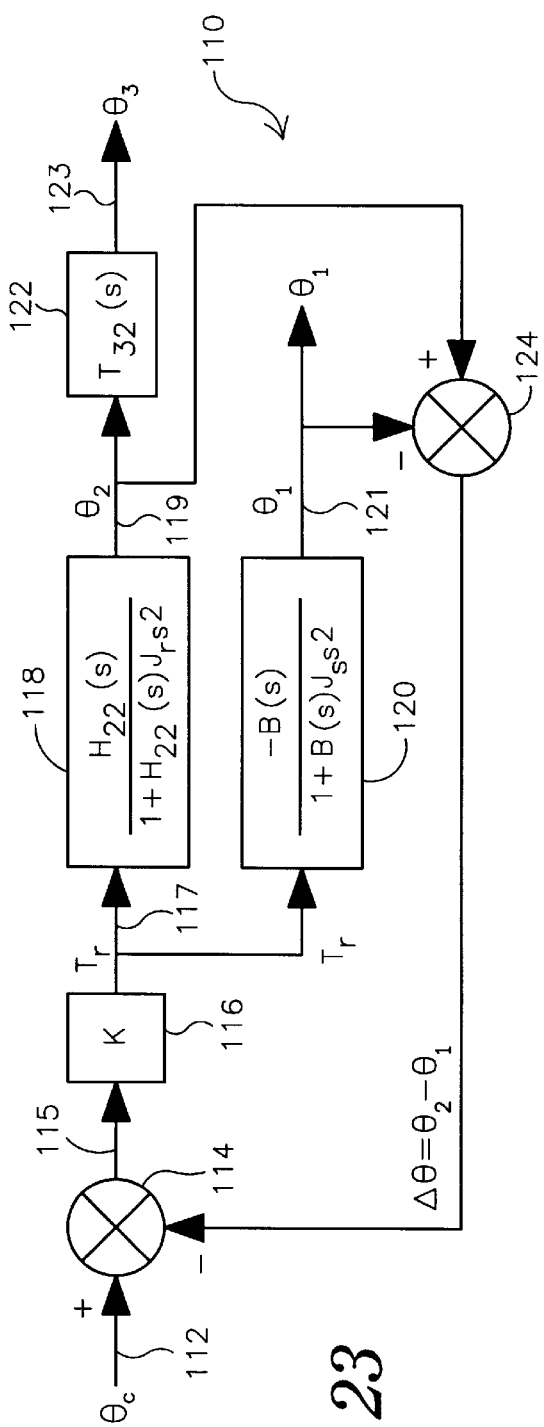
FIG. 23 is a block diagram of a motion control system employing a stepper motor developed in accordance with the principles of the present invention.

The block diagram illustrated in FIG. 23 represents a characterization of a stepper motor in a manner analogous to a closed-loop servo system. Viewing the stepper motor in this manner provides the opportunity to characterize the dynamics of discrete motor components and the motor as a whole, and to evaluate motor performance in response to applied command inputs. In FIG. 23, a command input function, $\theta_c$, is provided at an input 112 of the stepper motor system 110. It is noted that the command input function, $\theta_c$, is a function derived from the RVS principles of the present invention. The signal 115 output from the summing unit 114 represents a motion error signal which is determined using the feedback loop indicated in FIG. 23. The motion error signal 115 is characterized by the equation $\theta_c - \Delta\theta$, where $\Delta\theta$ represents the relative motion between the rotor and stator (i.e., $\Delta\theta = \theta_2 - \theta_1$). The motion error signal 115 output from the summing unit 114 is multiplied by a stepper motor constant, $K = k_1 I_0$, within block 116.

The signal 117 output from block 116 represents the magnetic interaction torque, $T_r$, which was previously characterized in Equation [32] above. The signal 117 is applied to block 118 which generates a signal 119 representative of the rotor motion, $\theta_2$, resulting from the applied torque, $T_r$, and the feedback torque, $T_s$, arising from the structure being moved (i.e., the driven structure 108). It is noted that the value of $\theta_2$ should closely track the value of $\theta_c$. The signal 117 is also applied to block 120 which generates a signal 121 representative of the stator motion, $\theta_1$, resulting from motor support dynamics. The signal 119 representing the rotor motion, $\theta_2$, is applied to block 122 which produces a signal 123 representative of the output motion, $\theta_3$, resulting from the rotor motion, $\theta_2$. It is noted that summing unit 124 combines angles $\theta_2$ and $\theta_1$ to obtain $\Delta\theta = \theta_2 - \theta_1$, which is fed back into the summing unit 114.

It can be seen that overshoot, in addition to other observable system outputs, is controlled by the terms $\theta_3 - \theta_2 = (T_{32}(s) - 1)\theta_2$. Hence, the transmissibility is very important since this parameter is controlling in terms of position error as is shown in the following equation:

$$\% \, \theta_{error} = \left(\frac{\theta_3 - \theta_2}{\theta_2}\right) \times 100 = [T_{32}(s) - 1] \times 100 \quad [34]$$

The equations and figures associated with characterizing a stepper motor as described above may be extended to develop a similar model for DC motors in general. It is assumed that the dynamic characteristics of the various DC motor structures discussed below are effectively equivalent to those previously described with respect to the stepper motor. The relevant equations which may be used to characterize a DC motor are provided as follows.

The motor torque parameter, $T_r$, which is applicable for a DC motor, is given as:

$$T_r = K_I I = \frac{K_I I}{R}[E - K_v s \Delta\theta] \quad [35]$$

where, $K_1$ represents the current torque constant, R represents the resistance, and $K_v$ represents the back EMF term. The voltage, E, recited in Equation [35] may be defined as:

$$E = G_a\left[K_P' + \frac{K_I'}{s} + K_D' s\right](\theta_c - \Delta\theta) \quad [36]$$

where, $G_a$ represents the forward power amplifier gain, the term $[K_P + K_I/s + K_D s]$ represents the PID controller term, and $\theta_c$ represents the command input function. In view of Equation [36], Equation [35] may be rewritten as:

$$T_r = \left[K_P + \frac{K_I}{s} + K_D s\right](\theta_c - \Delta\theta) - K_{EMF} s \Delta\theta \quad [37a]$$

where, $$K_P = (G_a K_P'/R) K_i$$

$$K_I = (G_a K_I'/R) K_i$$

$$K_D = (G_a K_D'/R) K_i$$

$$K_{EMF} = K_i K_v / R \quad [37]$$

It is noted that the torque applied to the rotor and stator, $T_r$, may be rewritten as:

$$T_r = T_a - K_{EMF} s \Delta\theta \quad [37c]$$

Figure 24:
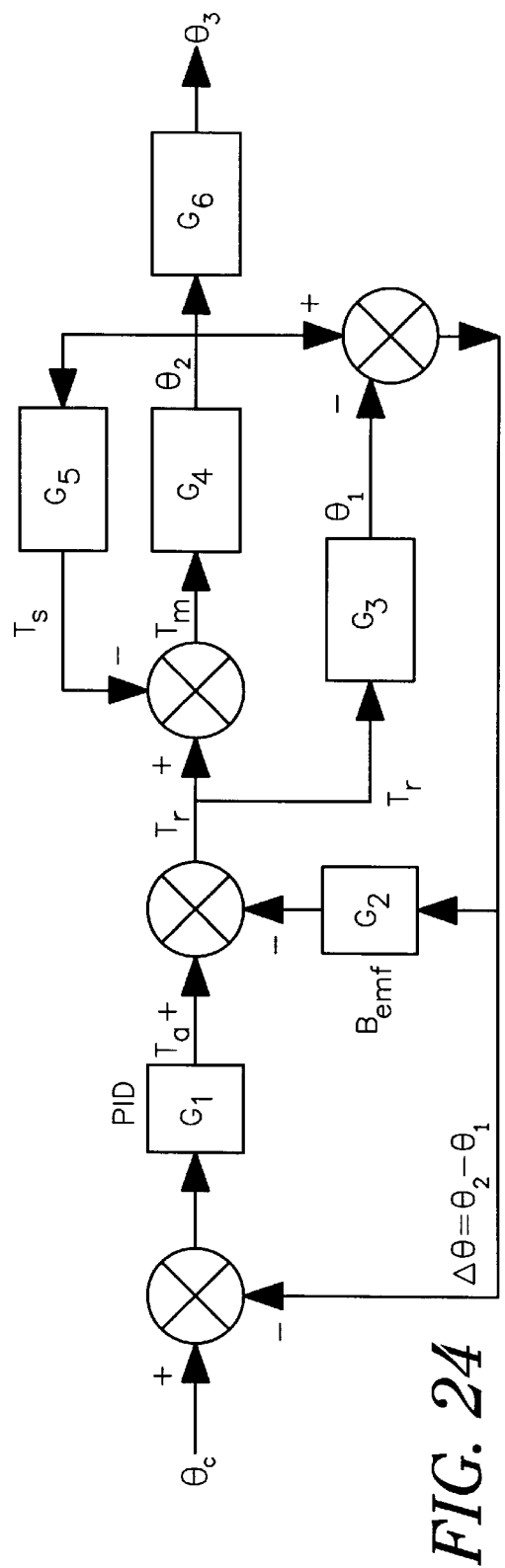
FIG. 24 is a block diagram of a motion control system employing a conventional DC motor modeled in accordance with the principles of the present invention.

Given the above-recited equations for characterizing a DC motor, the system block diagram shown in FIG. 24 may developed. It is noted that if there was no back EMF present, such as in the case when a current controlled power source is used, the term $K_v$ would be equal to 0. In such a case, the block diagram of FIG. 24 provides for the following equation:

$$T_r = \left(\frac{GK_I}{R}\right)(\theta_c - \Delta\theta) = K(\theta_c - \Delta\theta) \quad [38]$$

In the case of $K_v=0$, Equation [38], which is applicable to a general DC motor, is precisely the same as Equation [32], which is applicable for the stepper motor. Accordingly, using a current feedback scheme provides for essentially the same type of performance as the stepper motor under current control.

The values of the various parameters illustrated in FIG. 24 are given as follows:

$$G_1 = \left[K_P + \frac{K_I}{s} + K_D s\right] \quad [39]$$

$$G_2 = K_{EMF} s \quad [40]$$

$$G_3 = \frac{-B(s)}{1 + B(s)J_S s^2} \quad [41]$$

$$G_4 = \frac{1}{J_r s^2} \quad [42]$$

$$G_5 = \frac{1}{H_{22}(s)} \quad [43]$$

$$G_6 = T_{32}(s) = \frac{H_{32}(s)}{H_{22}(s)} \quad [44]$$

where, $G_1$ represents the controller-amplifier PID signal, and $G_2$ represents the back EMF term. It is noted that the negative term in Equation [41] is indicative of the base-stator dynamic relationship. Combining Equations [42] and [43] results in the following equation:

$$G_7 = \frac{G_4}{1 + G_4 G_5} = \frac{H_{22}(s)}{1 + H_{22}(s)J_r s^2} \quad [45]$$

where, the parameter $G_7$ represents the rotor driven structure dynamics term, which is characterized as block 118 in FIG. 23.

Figure 25:
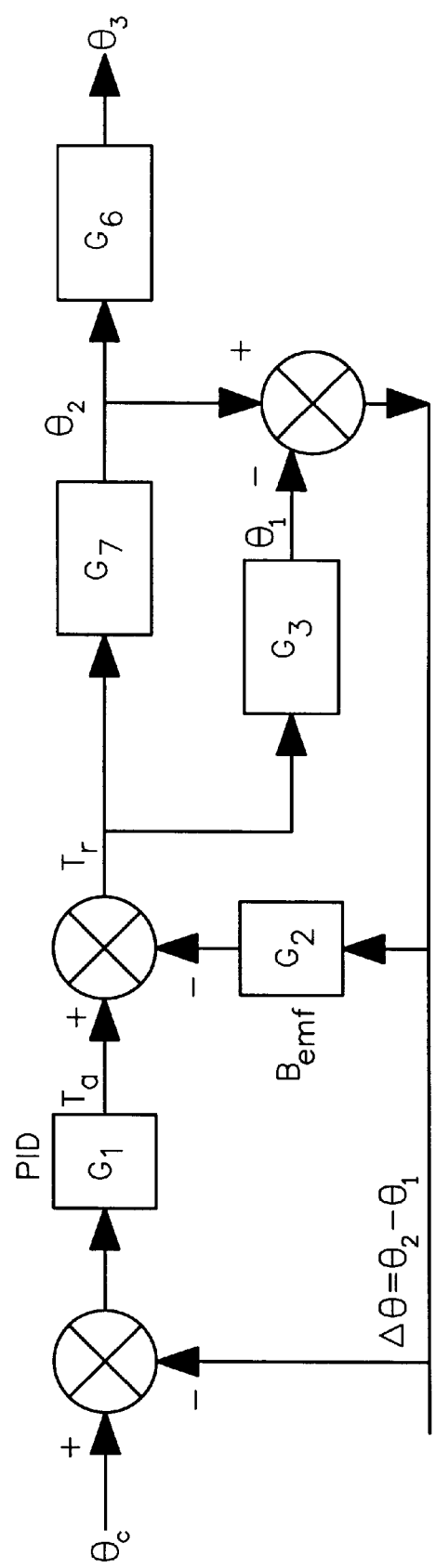
FIG. 25 is another block diagram of a motion control system employing a conventional DC motor in accordance with the principles of the present invention.

Using the equations provided above, the system block diagram illustrated in FIG. 25 may be developed. The input/output transfer function, which may be obtained using the system block diagram of FIG. 25, is given as follows:

$$\frac{\theta_3}{\theta_c} = \frac{G_1 G_6 G_7}{1 + (G_1 + G_2)(G_7 - G_3)} \quad [46]$$

It is noted that Equations [31] and [45] are identical, while Equations [23] and [41] are identical. $G_3$ in Equation [41] represents the motor support structure's effects on the motor's response, while $G_7$ represents the effects of the structure being driven on the motor's response.

Figure 26:
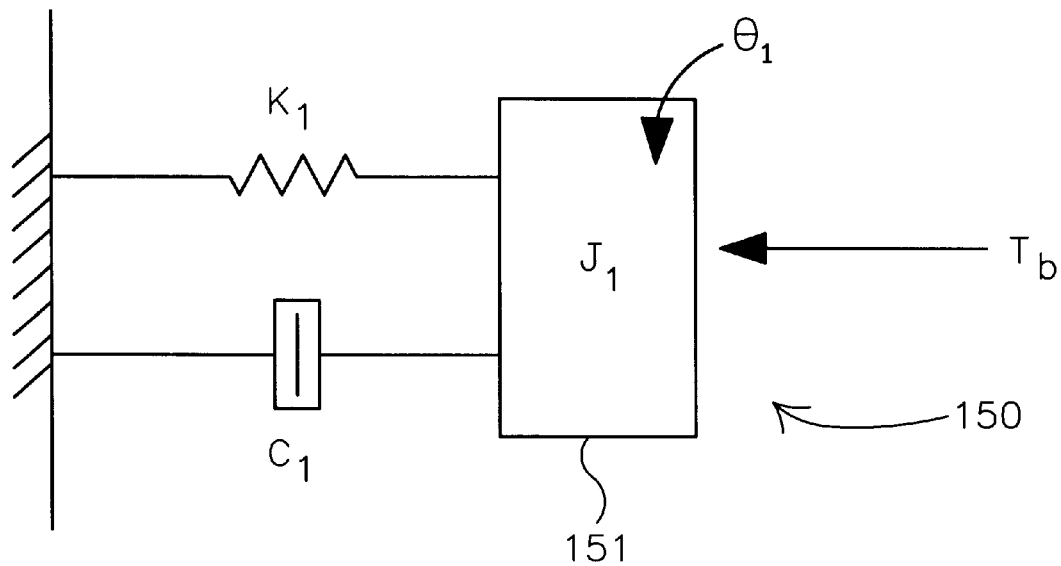
FIGS. 26–27 are illustrations of dynamic models characterizing the base foundation structure and driven structure of a stepper motor.

It may be useful for purposes of illustrating the principles of the present invention to develop a simple system model in order to determine the typical characteristics of the various structural elements. Referring now to FIG. 26, there is illustrated a simple mechanical model which may be useful in developing the dynamic characteristics of the motor stator's support structure. The motor support foundation 150 depicted in the dynamic model of FIG. 26 includes an effective foundation inertia 151 which is subjected to a torque, $T_b$, and a rotation, $\theta_1$. Associated with foundation inertia 151 is the foundation stiffness factor, $k_1$, and a foundation damping factor, $c_1$. The foundation is characterized by the following equation:

$$B(s) = \frac{1}{k_1 + c_1 s + J_1 s^2} \quad [47]$$

The stator dynamics is given by Equation [23] which, when combined with Equation [47], gives:

$$\frac{\theta_1}{T_r} = \frac{-B(s)}{1 + B(s)J_S s^2} = \frac{-1}{k_1 + c_1 s + (J_S + J_1)s^2} \quad [48]$$

It can be seen that the apparent natural frequency of the motor's foundation structure is lowered from:

$$\omega_n = \sqrt{\frac{k_1}{J_1}} \quad [49]$$

without the stator to:

$$\omega_1 = \sqrt{\frac{k_1}{J_1 + J_S}} \quad [50]$$

with the stator attached.

Figure 27:
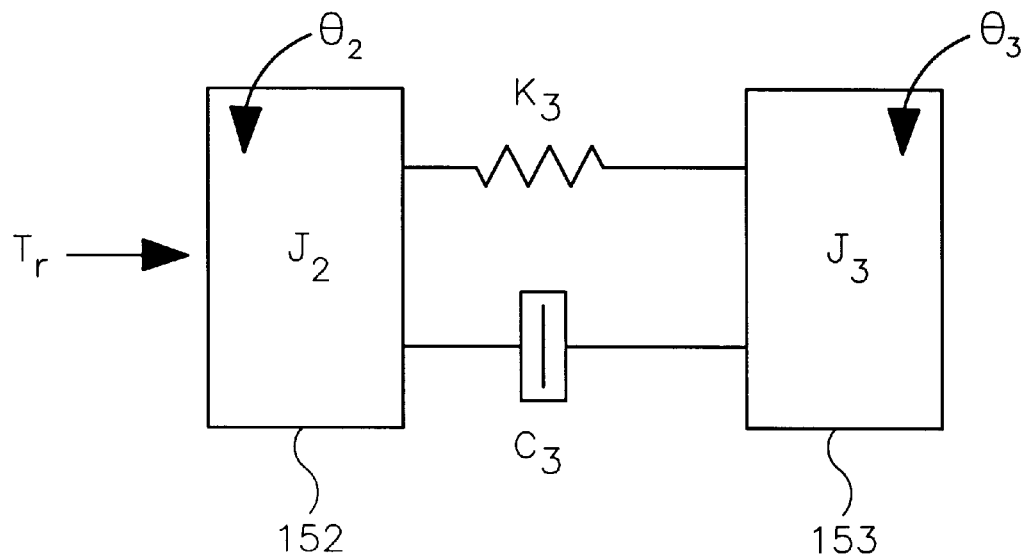

A system block diagram of the armature and driven structure dynamics is illustrated in FIG. 27. As was previously described, the driven structure includes the moving armature 152 of the motor and the object 153 being moved by the motor. In particular, and with reference to FIG. 27, the following equations apply:

$$\frac{\theta_2}{T_r} = \frac{H_{22}(s)}{1 + H_{22}(s)J_r s^2} \quad [51]$$

$$H_{22}(s) = \frac{k_3 + c_3 s + J_3 s^2}{(k_3 J + J c_3 s + J_2 J_3 s^2)s^2} \quad [52]$$

$$H_{32}(s) = \frac{k_3 + c_3 s}{(k_3 J + J c_3 s + J_2 J_3 s^2)s^2} \quad [53]$$

From Equations [51]–[53], the following equation may be derived:

$$\frac{\theta_2}{T_r} = \frac{k_3 + c_3 s + J_3 s^2}{[(J + J_r)k_3 + (J + J_r)c_3 s + J_2(J_3 + J_r)s^2]s^2} \quad [54]$$

where, $$J = J_2 + J_3 \quad [55]$$

represents the combined rigid body inertia. It can also be seen that:

$$T_{32}(s) = \frac{H_{32}(s)}{H_{22}(s)} = \frac{k_3 + c_3 s}{k_3 + c_3 s + J_3 s^2} \quad [56]$$

and that the fundamental natural frequency for the transmissibility is given by:

$$\omega_{23} = \sqrt{\frac{k_3}{J_3}} \quad [57]$$

It is noted that the fundamental natural frequency, $\omega_{23}$, as is described in Equation [57] above, is the same as if the mass inertia, $J_2$, was fixed (i.e., $\theta_2=0$).

From Equation [54] above, the fundamental natural frequency of the motor is given by:

$$\omega_{22} = \sqrt{\frac{k_3(J_2 + J_3 + J_r)}{J_2(J_3 + J_r)}} \qquad [58]$$

The fundamental natural frequency of the stepper motor exclusive of the driven structure is given by:

$$\omega_S = \sqrt{\frac{K}{J_r}} \qquad [59]$$

The fundamental natural frequency of the DC motor exclusive of the driven structure is given by:

$$\omega_{DC} = \sqrt{\frac{Gk_1/R}{J_r}} \qquad [60]$$

It is noted that the fundamental natural frequency of the DC motor characterized by Equation [60] is essentially the same as that for the stepper motor, since:

$$K = \frac{GK_I}{R} \qquad [61]$$

The basic DC motor on a rigid foundation (i.e., $\theta_1=0$) may thus be described by the following equation:

$$\left[J_r s^2 + \left(\frac{K_V K_I}{R}\right)s + \frac{GK_I}{R}\right]\theta_2 = \left(\frac{GK_I}{R}\right)\theta_c \qquad [62]$$

As was previously discussed, a motor control scheme should compensate for ripple torque which is known to adversely affect the performance of a motor. Ripple torque is a position dependent phenomena. The current delivered to the motor may be varied in order to counteract the amount of ripple torque experienced. As such, the input torque relationship is given as:

$$K\theta_d - \lambda \sin(r\theta) \approx K\theta_i = J[|\$]\$"g\ddot{v} + c\dot{\theta} + K\theta \qquad [63]$$

where, $\lambda$ represents the magnitude of the ripple torque and $\theta_c$ represents the desired command input created using RVS techniques to generate the desired behavior. Then, the required command input, $\theta_d$, may be expressed as:

$$\theta_d = \theta_c + \frac{\lambda}{K}\sin(r\theta), \text{ where } \theta \approx \theta_c \qquad [64]$$

A complication often encountered when designing an appropriate command input profile that addresses undesirable ripple torque concerns the effects of system dynamics which alter the $\sin(r\theta)$ terms from the ideal. By using the RVS techniques described herein, it has been found through computer simulation that ripple torque may reduce to about 20%–30% of the original value of $\lambda$.

In accordance with another embodiment of a methodology to compensate for undesirable ripple torque, a control technique may be implemented which introduces damping into the system so that system response is reduced. This can be accomplished electrically using the H-bridge circuitry illustrated in FIGS. 28A and 28B.

Figure 28A:
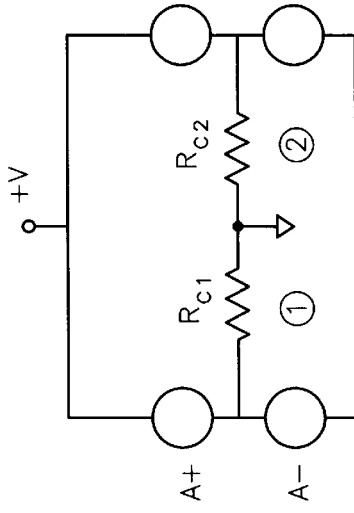
FIGS. 28A–28B are diagrams of H-bridge circuitry suitable for controlling a stepper motor in accordance with one embodiment of the present invention.
Figure 28B:
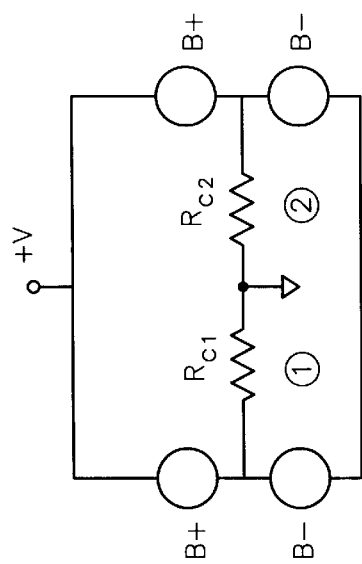

In accordance with a conventional approach to controlling the H-bridge circuitry illustrated in FIGS. 28A–28B, each of the coils, A and B, is grounded at the center of the H-bridge. When the switch A+ is active, coil #1 drives the motor, while coil #2 electrically dampens the motor by back EMF current passing through the resistors $R_{c2}$ and $R_d$ (i.e., $R_{c2}+R_d=R$). An equivalent degree of damping occurs when the A– switch is ON, such that coil #2 drives the motor while coil #1 electrically dampens the motor. For motor winding B, the same behavior occurs when switch B+ is in the ON state or switch B– is in the ON state.

It can be appreciated that implementing the above-described conventional H-bridge damping scheme generally results in damping that is subject to variation during the time in which power is switched either ON or OFF. A typical H-bridge is constructed and controlled so that both A+ switches are ON or OFF at the same time. This results in the production of a damping torque that is pulsating at the power switching frequency, typically in the range of 20–25 kHz. Also, the switches are in an ON state only as long as a power pulse is required.

The deficiencies associated with conventional H-bridge control schemes are overcome by implementing the following control methodology and H-bridge configuration in accordance with one embodiment of the present invention. The improved control circuitry looks like the H-bridge circuitry shown in FIGS. 28A–28B, but the lower switches are controlled independent of the upper switches. In particular, when the upper A+ switch is being used to power the motor, the lower A+ switch remains in the ON state, while upper and lower A– switches remain OFF. Similarly, when the upper A– switch is being used to power the motor, the lower A–switch remains in the ON state, while upper and lower A+ switches remain OFF. An analogous control methodology is employed with respect to switching of the upper and lower B+ and B– switches. In this way, very little pulsing occurs due to the damping circuit always being ON for that coil.

Figure 29A:
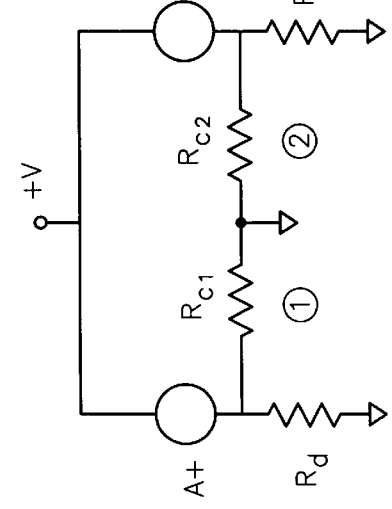
FIGS. 29A–29B illustrate modified H-bridge circuitry in accordance with another embodiment of the present invention.
Figure 29B:
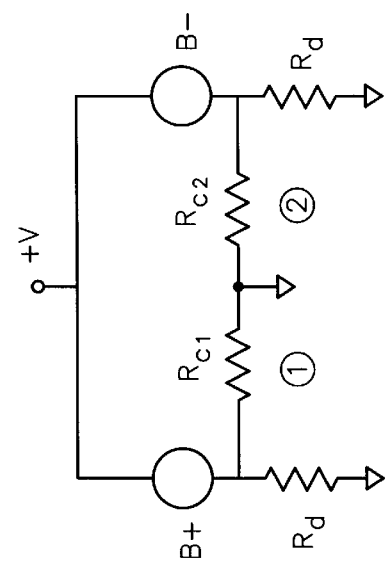

In accordance with another embodiment, reference is made to FIGS. 29A and 29B. In accordance with this embodiment, the windings are controlled such that the inactive winding is always damping the motor motion through resistor $R_d$. When either switch A+ or switch A– is active, current flows through both resistor $R_c$ and resistor $R_d$ on that side. Resistor $R_d$, however, provides for electrodynamic damping of the motor when the switch on the respective other side of the bridge circuit is OFF. The circuit depicted in FIGS. 29A and 29B operate in an optimal manner when the value of $R_d >> _c$.

Another phenomenon that adversely affects the performance of a DC motor involves back EMF. In general, back EMF reduces the amount of current that can be driven through the coils which, in turn, reduces the torque producing capability of the motor. This is the case since motor torque may be characterized by the motor constant multiplied by the current, which is represented in the following equation:

$$T = K_M I \qquad [65]$$

Ignoring inductance, the current is given by:

$$I = \left(\frac{V - EMF}{R}\right) \qquad [66]$$

The undesirable consequences of back EMF in terms of reduced motor control and accuracy are remedied by implementing a back EMF compensation scheme in accordance with an embodiment of the present invention. In accordance with one embodiment of a back EMF compensation approach, a power pulse which is longer in duration as compared to a power pulse that does not compensate for back EMF effects may be used to counteract the apparent reduction in current.

Figure 30:
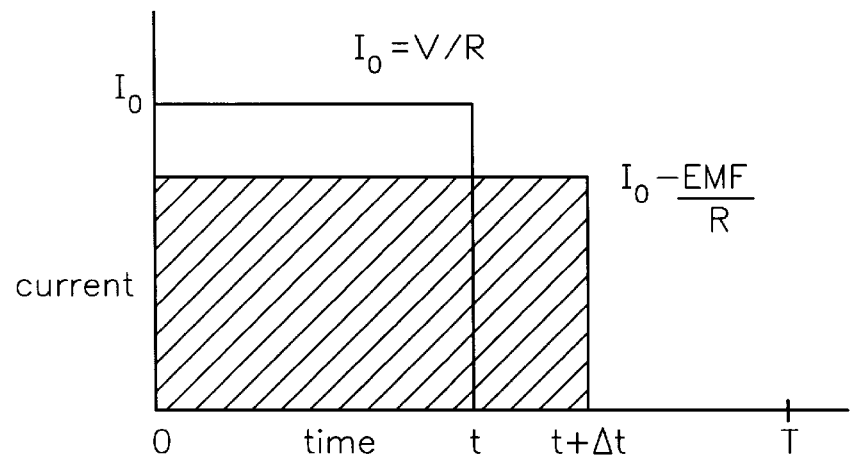
FIG. 30 graphically illustrates a technique for increasing the duration of a power pulse to compensate for back EMF in accordance with an embodiment of the present invention.

As is illustrated in FIG. 30, the average current, $I_{AVE}$, is given by:

$$I_{AVE} = \frac{I_0 t}{T} \quad [67]$$

Because of back EMF, however, this current is reduced to:

$$\left(I_0 - \frac{EMF}{R}\right) \quad [68]$$

As is shown in FIG. 30, the period of the power pulse may be extended by a time duration equivalent to $\Delta t$, such that the shorter rectangle, in terms of height (i.e., smaller value of current), has the same area as the taller rectangle. Thus, this increase in time period of the power pulse, $\Delta t$, is given by:

$$\Delta t = \left(\frac{I_1}{I_0 - I_1}\right) t \quad [69]$$

$$I_1 = \frac{EMF}{R} \quad [70]$$

$$I_0 = \frac{V}{R} \quad [71]$$

It is known that the magnitude of back EMF is proportional to motor speed. Therefore, the time $\Delta t$ associated with the power pulse should be increased to compensate for the speed of the motor. As such, back EMF compensation can be realized by extending the period of the power pulse.

Figure 31:
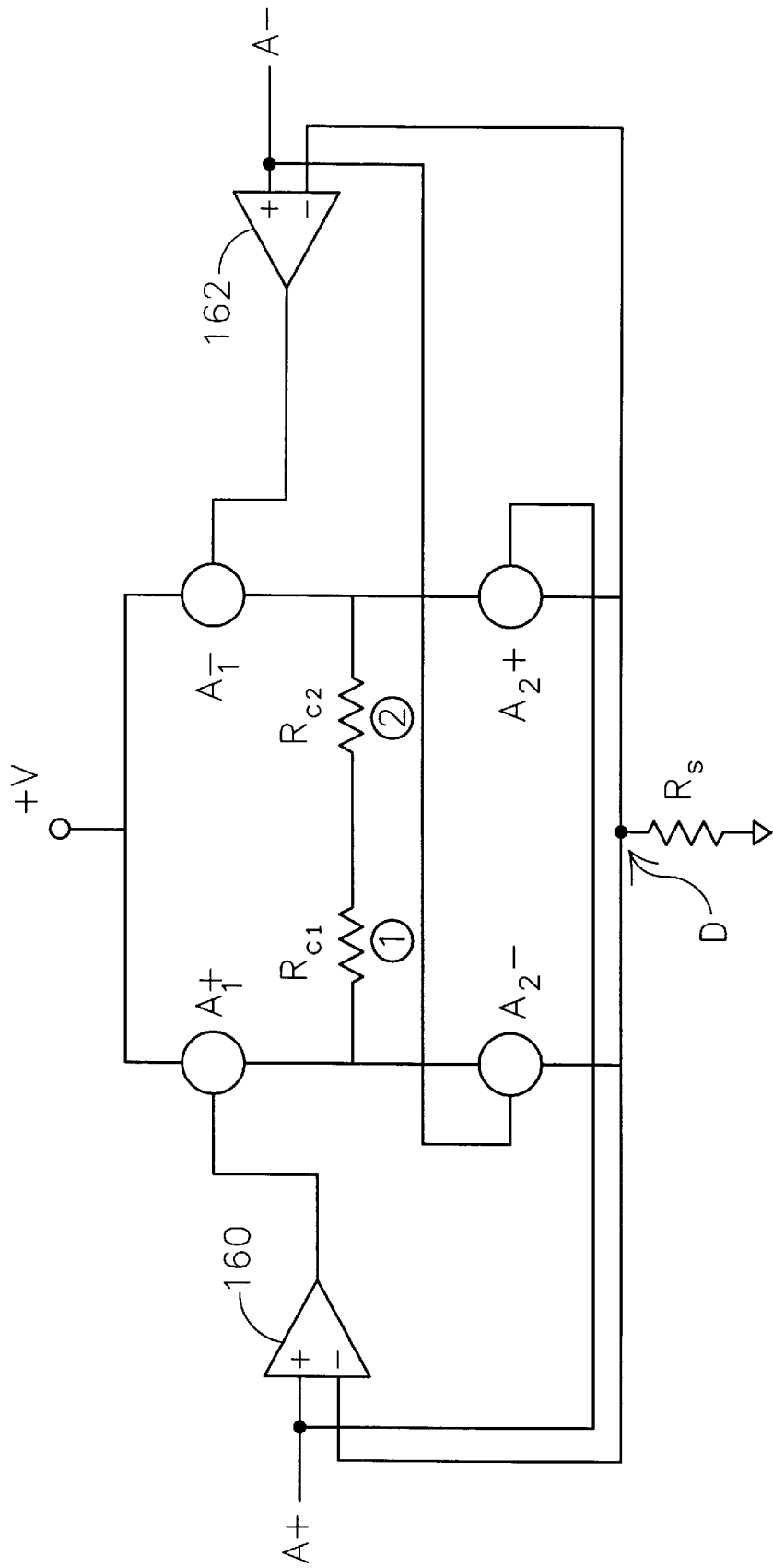
FIG. 31 is a schematic depiction of a control circuit which employs current feedback to compensate for back EMF in accordance with another embodiment of the present invention.

In accordance with an alternative approach to compensating for back EMF, and with reference to FIG. 31, current feedback may be employed so that the designed current level, $I_0 = V/R$ is achieved even where there is back EMF. The circuit illustrated in FIG. 31 is shown as controlling the winding set A, although the circuit may be employed for controlling other winding sets. Winding set A, as is shown in FIG. 31, includes upper switches $A_1+$ and $A_1-$ and lower switches $A_2+$ and $A_2-$. Switches $A_1+$, $A_2+$, $A_1-$, and $A_2-$ typically include one or more switching transistors. An operational amplifier 160 has an output coupled to upper switch $A_1+$. The positive input of operational amplifier 160 is coupled to lower switch $A_2+$ and to a signal source providing an A+ control signal. The negative input of operational amplifier 160 is coupled node D, which represents the output voltage ground point, and to the negative input of operational amplifier 162.

Operational amplifier 162 has an output coupled to upper switch $A_1-$. The positive input of operational amplifier 162 is coupled to lower switch $A_2-$ and to a signal source providing an A– control signal. The negative input of operational amplifier 160 is coupled node D and to the negative input of operational amplifier 160.

In general operation, when the A+ control signal applied to operational amplifier 160 is in a high state, switch $A_2+$ is turned on directly, but switch $A_1+$ is adjusted by operational amplifier 160 to deliver the desired current through resistors $R_{c1}$ and $R_{c2}$ and through sensing resistor $R_s$. Similarly, operational amplifier 162 turns upper switch $A_1-$ ON and OFF at a rate sufficient to obtain the desired amount of current when the A– control signal is applied to the positive input of operational amplifier 162. It will be appreciated that there are a number of other possible arrangements that will achieve the same goal.

As was briefly discussed hereinabove, robustness may in some instances be expressed in terms of notch width with respect to an acceleration frequency spectra curve, where notch width is expressed in terms of (1) the frequency ratio $f/f_n$ and (2) the magnitude of the largest local peak in the acceleration frequency spectra curve. The term largest local peak is meant to refer to the magnitude of the largest peak on either side of the notch in question. A more general way of expressing these criteria can be recited as an acceleration frequency spectra curve having a notch width within desired limits at a magnitude equal to a desired percentage of the magnitude of the largest local peak in the acceleration frequency spectra. These general concepts will be illustrated below with reference to FIGS. 32–36. The desired notch width preferably occurs in at least one of the first five notches in the acceleration frequency spectra curve, more preferably within the first two notches, and even more preferably at the first notch.

In a similar manner, the potential of a command input to generate noise may be judged numerically as well as based on the acceleration frequency spectra curve associated with the command input. It may be preferred that the peak magnitudes of the acceleration frequency spectra at frequency ratios of approximately $5(f/f_n)$ or more be approximately 5% or less of the magnitude of the largest peak in the acceleration frequency spectra; more preferably the peak magnitudes at frequency ratios of approximately $5(f/f_n)$ or more are approximately 0.5% or less of the magnitude of the largest peak. Alternatively, it may be preferred that the peak magnitudes of the acceleration frequency spectra at frequency ratios of approximately $10(f/f_n)$ or more be approximately 5% or less of the magnitude of the largest peak in the acceleration frequency spectra; more preferably the peak magnitudes at frequency ratios of approximately $10(f/f_n)$ or more are approximately 0.5% or less of the magnitude of the largest peak. On a more general level, this concept can be expressed as the command input has the desired level of potential noise generation when the acceleration frequency spectra of the command input has peak magnitudes below a desired level over a range of frequency ratios. As above, these concepts will be illustrated below with reference to FIGS. 32–36.

Figure 32:
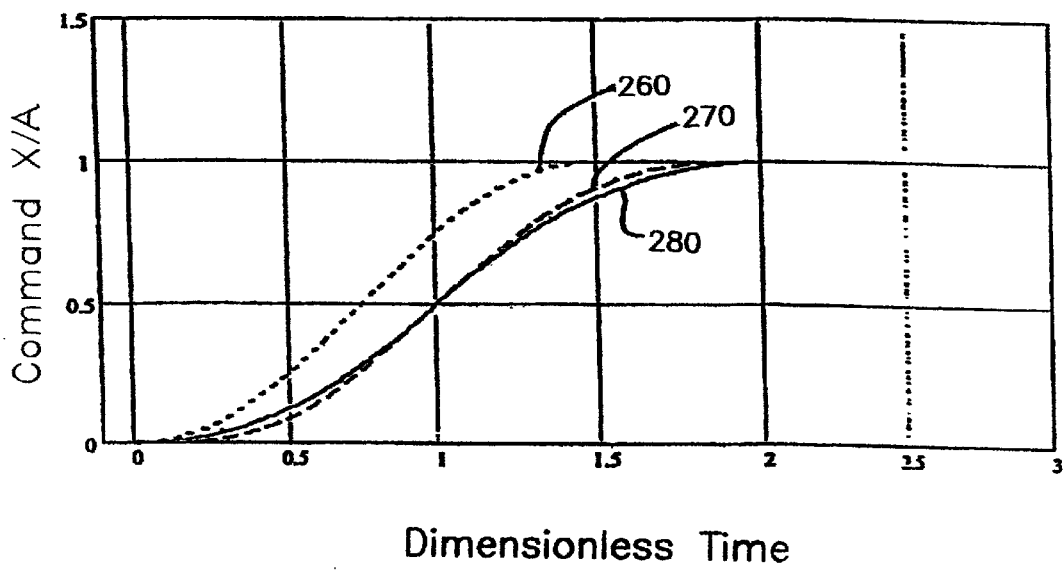
FIG. 32 is a composite plot of various command inputs developed using robust vibration suppression techniques of the present invention.

FIG. 32 illustrates three different dimensionless command inputs (x/A) plotted as a function of dimensionless time ($t/T_n$). A comparison of these command inputs based on the principles discussed above will now be described. For purposes of simplicity, the three command inputs will be referred to hereinbelow by acronyms, i.e., OMC command input 260, RMS command input 270, and ATS command input 280, although it should be noted that each of the command inputs are described in detail below. The command inputs have different command input periods which are represented as a function of the fundamental natural period, $T_n$, of the physical system to which the command inputs are applied. The shortest command input period of the three command inputs depicted in FIG. 32 is $1.5T_n$ and is associated with the OMC command input 260, while both the RMS command input 270 and the ATS command input 280 have command input periods of $2T_n$.

Figure 33:
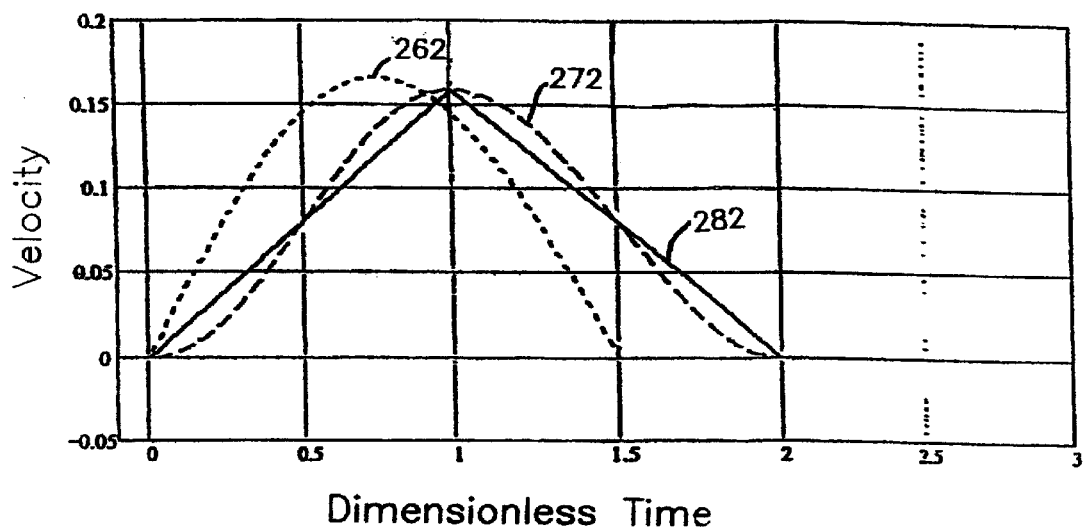
FIG. 33 is a composite plot of the velocity profiles for the command inputs depicted in FIG. 32.
Figure 34:
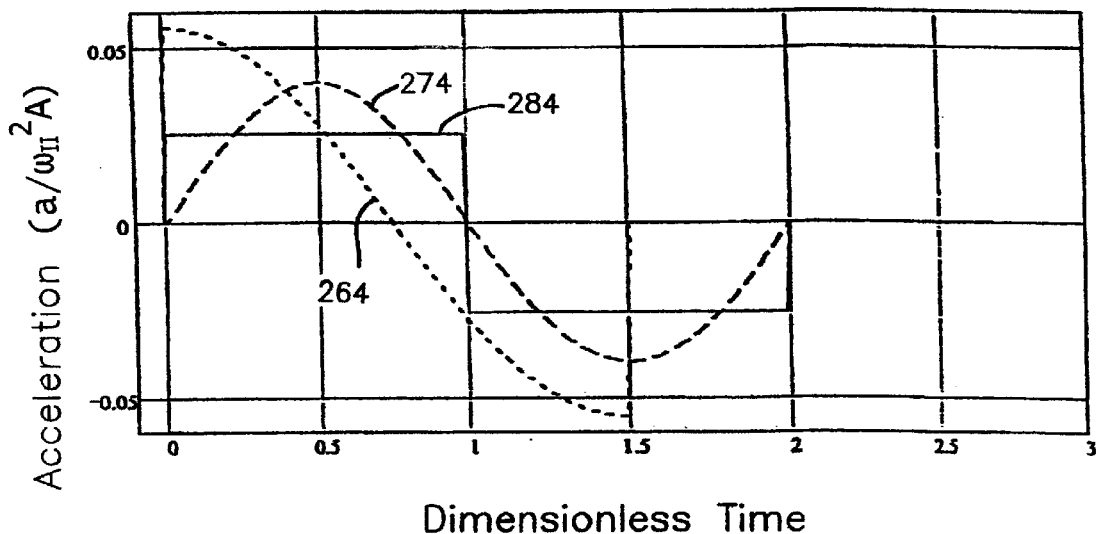
FIG. 34 is a composite plot of the acceleration profiles for the command inputs depicted in FIG. 32.
Figure 35:
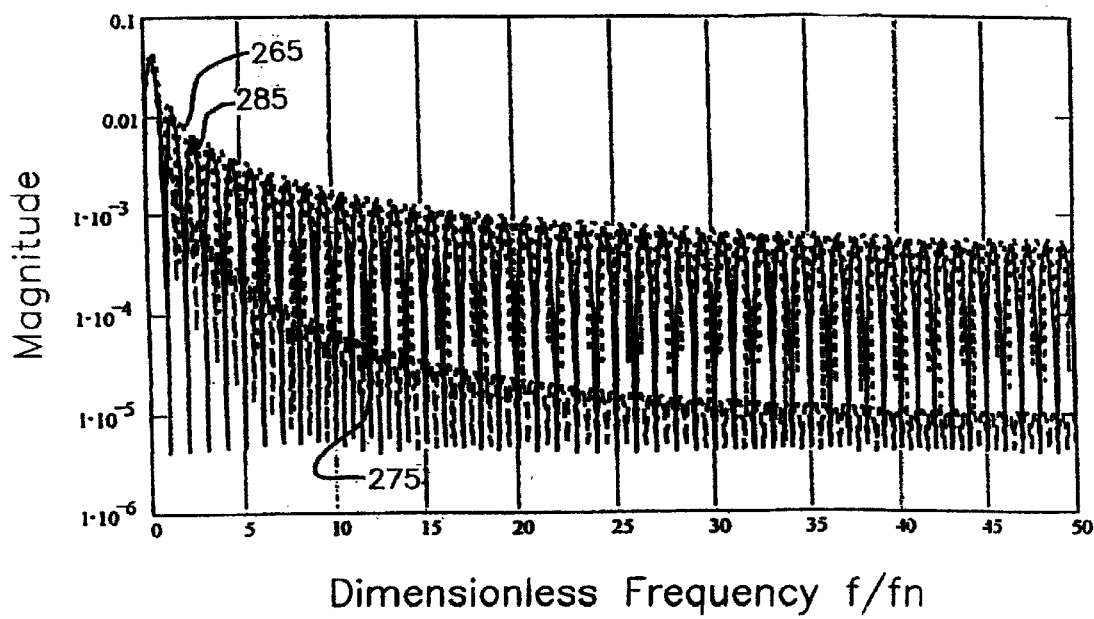
FIG. 35 is a composite plot of the frequency spectra of the acceleration profiles depicted in FIG. 34.

The corresponding dimensionless velocity ($v/\omega_n A$) profiles generated as a result of the command inputs, i.e., OMC velocity profile 262, RMS velocity profile 272 and ATS velocity profile 282, are all plotted in FIG. 33 as a function of dimensionless time. FIG. 34 contains plots of the corresponding dimensionless acceleration ($a/\omega_n^2 A$) profiles, i.e., OMC acceleration profile 264, RMS acceleration profile 274 and ATS acceleration profile 284. FIG. 35 is a plot of the frequency spectra of the Fourier Transforms of the command input acceleration profiles of FIG. 34. As shown, the RMS frequency spectra curve 275 of the RMS acceleration profile 274 is magnitudes lower than the OMC frequency spectra curve 265 of the OMC acceleration profile 264 and the ATS frequency spectra curve 285 of the ATS acceleration profile 284 for frequency ratios greater than $5f/f_n$.

Figure 36:
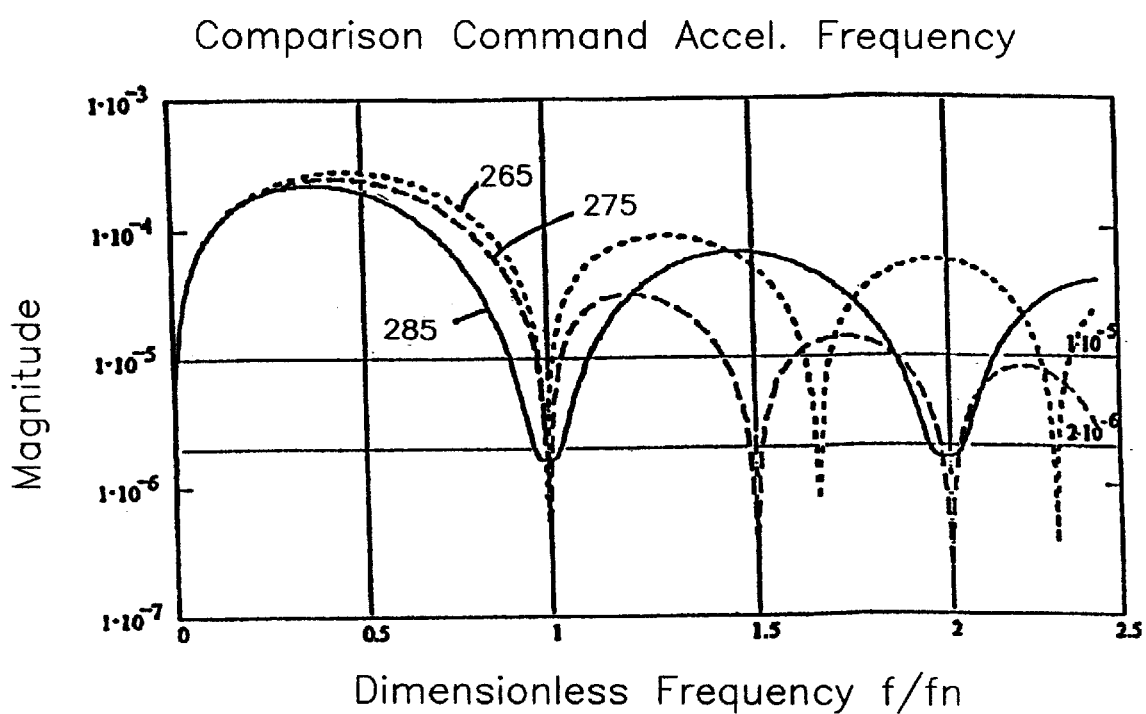
FIG. 36 is an expanded view of the first and second lower frequency notches from FIG. 35.

FIG. 36 is an enlarged view of the first two frequency notches shown in FIG. 35 and illustrates some of the basic concepts implicated when developing an appropriate command input profile for a given physical system, such as a DC motor or a stepper motor for example. First, the ATS frequency spectra curve 285 shows the broadest notch at a frequency ratio of one which is indicative of the relative ability of the ATS command input to accommodate small changes in the fundamental natural frequency of the system to which the command input is applied as compared to the RMS and OMC command inputs. If the selection criteria relating to notch width as a function of frequency ratio is applied, the magnitude of the acceleration frequency spectra for the first notch of the ATS curve 285 at $\pm 10\%$ of $f/f_n$ is about 4% of the magnitude of the largest local peak ($10^{-5}$), while the magnitude of the acceleration frequency spectra for the first notch of the ATS curve 285 at $\pm 5\%$ of $f/f_n$ is about 1% of the magnitude of the largest local peak ($2\times10^{-6}$). As can be seen from FIG. 36, the corresponding magnitudes for either the OMC and RMS curves 265 and 275 would be orders of magnitude higher than that for the ATS curve 285 at the same notch widths, i.e., $\pm 10\%$ or $\pm 5\%$ of $f/f_n$.

As discussed above, this is indicative of a robust command input, i.e., a command input that is capable of handling changes without resulting in an output response accompanied by large increases in residual vibration when there are small changes in $f_n$. Such changes could be caused, for example, by wear do to use or other causes, manufacturing tolerances, changes in system damping or stiffness, etc.

Also depicted in FIG. 36 is the relatively steep reduction in the peak magnitudes of the RMS acceleration frequency spectra curve 275 for higher frequencies. The magnitude of the acceleration frequency spectra curves for frequencies of $f > f_n$ is an indicator of the relative ability of each of the command inputs to excite the higher frequency components in a given physical system. This aspect of the acceleration frequency spectra curves can be correlated to the relative potential of each system to generate noise as a result of application of the corresponding command input. This is clearly shown in FIG. 35 where ATS and OMC are nearly equally poor in this regard and RMS is vastly superior.

As a general rule, the command input function chosen should be applied for a command input period that is related to the fundamental natural frequency, $f_n$, of the physical system to which the command input will be applied. By so doing, the output response of the physical system will exhibit reduced residual vibrations at the end of the command input period as demonstrated by the acceleration frequency spectra curve. In other words, applying a command input with a command input period that is properly matched with the fundamental natural frequency of the physical system will result in placement of the combination of the physical system and command input within one of the notches in the acceleration frequency spectra curve, preferably one of the first five notches, more preferably within the first two notches, and even more preferably within the first notch.

Matching of the command input period to the fundamental natural frequency of the physical system is accomplished by applying the command input over its complete command input period, where the command input period has the proper relationship to the fundamental natural frequency of the physical system. The relationship between the command input periods and the fundamental natural frequency of the physical system is illustrated in FIG. 32 as a function of the fundamental natural period, $T_n$, of the physical system (where $T_n=1/f_n$). The OMC command input period is $1.5T_n$ and the RMS and ATS command input periods are both $2T_n$.

The matching between the command input period can take a variety of forms such as selection of the command input with the proper command input period for a physical system in which the fundamental natural frequency is known. It may not, however, be possible to have enough knowledge of all the variables in the physical system to know the fundamental natural frequency of the system. As a result, the command input period could be adjusted such that it has the proper relationship to the expected or typical fundamental natural period, $T_n$, of the physical system. Evidence of the proper relationship between the command input period and the fundamental natural period of the physical system will be seen in reductions in noise and/or residual vibration at the end of the command input period.

An effective approach to deriving new command inputs involves processing or manipulating an initial command input to obtain a new command input or waveform. The processing typically involves substituting the function defining the initial command input with an new function formulated by the motion control system associated with the physical system. In the case of a DC motor or stepper motor, for example, a conventional ramp command input such as that typically used in a traditional microstepping approach may be substituted with a parabolic or cubic command input. Alternatively, the motion control system may formulate an intermediate command input or waveform. The intermediate command input or waveform is then integrated over the command input period at least once to obtain the final command input. Further details concerning the general concepts of developing an appropriate command input for a generalized physical system are provided in U.S. Ser. No. 08/912,283 entitled "Robust Vibration Suppression Methods and Systems," the content of which is incorporated herein by reference.

In developing an appropriate command input function, $\theta_{c_s}(t)$, for controlling the movement of a motor, such as a DC motor or stepper motor, of a motion control system, the second derivative of the command input function has been found to dominate the behavior of the motor's movement. It has been found, for example, that the position error at an arrival destination is proportional to the magnitude of the relative motion, $\theta_3 - \theta_2$, as has been discussed previously. For typical values of $\theta_3$, it can be seen from Equations [28], [29], [52], and [53] that:

$$H_{22}(s) = \frac{N_1(s)}{D(s)s^2} \text{ and} \qquad [72]$$

$$H_{32}(s) = \frac{N(s)}{D(s)s^2} \qquad [73]$$

where, $H_{22}(s)$ represents the driving point receptance, $N_1(s)$ represents the numerator of the driving point receptance, $D(s)$ is the common denominator which contains the natural frequencies of the structure being driven, $H_{32}(s)$ represents the transfer receptance, and $N(s)$ represents the numerator of the transfer receptance. It is noted that Equations [72] and

[73] above have the same denominator but different numerators. It can be further seen that:

$$N_1(s)=N(s)+Js^2 \qquad [74]$$

where, J represents the output inertia. A computation of the relative motion, $\theta_3-\theta_2$, may thus be performed using the following equation:

$$\theta_3 - \theta_2 = \left[\frac{N(s)-N_1(s)}{N_1(s)}\right]\theta_2 = \frac{-Js^2\theta_2}{N_1(s)} \qquad [75]$$

Equation [75] above indicates that the output relative motion, $\theta_3-\theta_2$, is dominated by the input inertia load, which may be characterized by the following equation:

$$Js^2\theta_2 = J f[\$]\$\ddot{g}\ddot{v}_2 \qquad [76]$$

The implication of Equation [76] is that the error term (overshoot, etc.) is dominated by the second time derivative of the command input function, $\theta_c(t)$.

Figure 37:
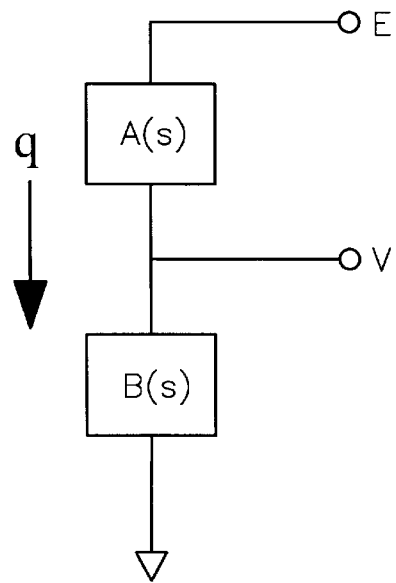
FIG. 37 is an illustration of a basic electrical circuit which is useful in demonstrating that the error term, such as overshoot, is dominated by the second time derivative of the input function.

A similar result is obtained when analyzing a simple electrical circuit, such as that illustrated in FIG. 37. Assuming that A(s) and B(s) each represents an electrical load, such as a resistive, inductive, or capacitive load, the following equations are applicable:

$$[A(s)+B(s)]q=E \qquad [77]$$

$$q = \frac{E}{A(s)+B(s)} \qquad [78]$$

$$B(s)q=V \qquad [79]$$

$$E=V+A(s)q \qquad [80]$$

It can be seen that the error term, n, is given by:

$$\eta = V - E = -A(s)q \qquad [81]$$

$$= \left[\frac{-A(s)}{A(s)+B(s)}\right]E \qquad [82]$$

If, for example, the element A(s) represents an inductor, then $A(s)=Ls^2$, while $B(s)=Rs+1/C$ if the element B(s) represents a capacitor and a resistor in series. In this case, Equation [82] above can be rewritten in the following form:

$$\eta = \frac{V-E}{E} = \frac{-Ls^2}{Ls^2+Rs+1/C} \qquad [83]$$

Again, it can be seen that the second time derivative of E(t) is a dominant factor in exciting the voltage error.

As was discussed previously, an appropriate command input function for a conventional DC motor or stepper motor is one that minimizes the frequency content such that the second time derivative, a(t), has the lowest possible frequency spectra given the dynamics and performance requirements of a particular DC motor or stepper motor. In addition to the two command input functions, OMC and RMS, discussed previously, the inventors have determined that two general classes of preshapes are appropriate for developing optimal command input functions for certain motion control systems, including those that employ DC and stepper motors.

The preshapes of the first general class are developed from impulse-type functions which generate step-like changes. The step-like changes lead to a ramp-type function upon integration which, in turn, lead to parabolic functions. The parabolic functions, in turn, lead to cubic time equations. Reference is made to FIGS. 38A–38D which respectively depict various derivative forms of bang-bang, ramp, ATS (Acceleration Time Squared), and ATC (Acceleration Time Cubed) preshapes. FIGS. 38A–38D illustrate the improvement of command smoothness as the impulses are applied at the higher derivatives. For example, the ATS preshape shown in FIG. 38C has impulses at the third derivative level, a square shape for acceleration, and two linear functions for velocity. By way of further example, the ATC preshape shown in FIG. 38D has impulses at the fourth derivative level, square waves at the third derivative level, a linear shape for acceleration, and a parabolic shape for velocity.

Figure 39:
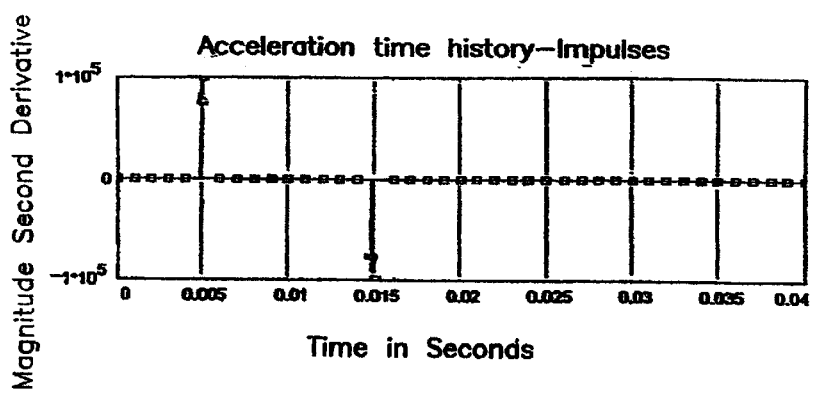
FIGS. 39–40 are illustrations of an acceleration time history and impulse frequency spectra associated with a conventional linear ramp preshape.
Figure 40:
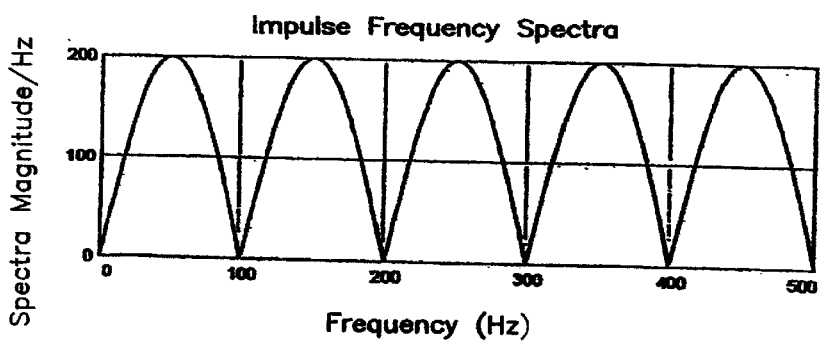

With reference to FIG. 38A, the bang-bang preshape is generated by two impulses in the first time derivative. The bang-bang preshape has relatively poor robustness characteristics, but does provide for high velocity movements. The linear ramp preshape, which is depicted in FIG. 38B, produces a step change in velocity with respect to the first time derivative. This step change is generated by impulses in the second time derivative. These two impulses, shown in FIG. 39, generate an interesting frequency spectra as is shown in FIG. 40. It can be seen from FIG. 39 that two unit impulses are applied, one at 0.005 seconds and the other at 0.015 seconds. As such, there is a 10 ms time difference between the two unit impulses. The mean value of these pulses is zero. The corresponding frequency spectra shown in FIG. 40 indicates zeros at every 100 Hz. The corresponding robustness plot would show a similar behavior, namely, deep notches followed by peaks of equal magnitude.

The ATS preshape, which is depicted in FIG. 38C, has impulses in the third time derivative, a square wave in the second time derivative, and two linear functions in the first time derivative, as can be appreciated with reference to the following equations:

$$v_1(t)=at \text{ for } 0<t<T/2 \qquad [84a]$$

$$v_2(t)=a(T/2)(t-T/2) \text{ for } T/2<t<T \qquad [84b]$$

$$v(t)=0 \text{ for } t \text{ outside the range of } 0<t<T \qquad [84c]$$

where, v represents velocity, a represents acceleration, and T represents the move time. The second order time functions are characterized by the following equations:

$$q_1(t)=at^2/22 \text{ for } 0<t<T/2 \qquad [85a]$$

$$q_2(t)=-aT^2/4+aTt-at^2/2 \text{ for } T/2<t<T \qquad [85b]$$

$$q=q_0=aT^2/4 \text{ for } t>T \qquad [85c]$$

Figure 41:
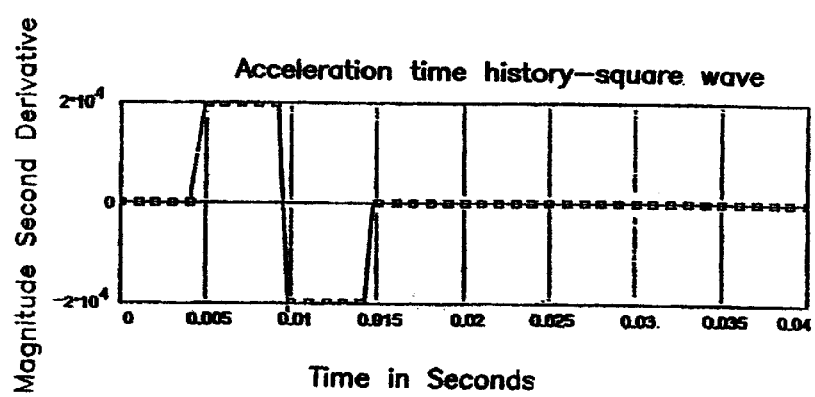
FIGS. 41–42 are graphical illustrations of an acceleration time history and frequency spectra associated with an ATS preshape function.

As is indicated in the acceleration time history graph shown in FIG. 41, the positive and negative going portions are 5 ms long, respectively. This square pulse of equal positive and negative portions leads to a linear velocity triangle as can be seen in FIG. 38C. This velocity triangle leads to a parabolic preshape, thus resulting in the name ATS, which corresponds to the function $At^2$.

Figure 42:
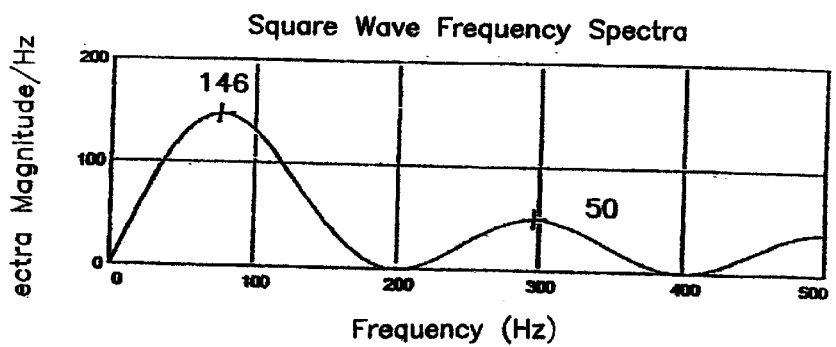

The corresponding frequency spectra shown in FIG. 42 reveals several important features. First, the first peak value has a magnitude of approximately 146 at 75 Hz, with the second peak occurring at 300 Hz and having a magnitude of 50. Second, the zero notches occur at 200 Hz, 400 Hz, and every 200 Hz thereafter, instead of 100 Hz, 200 Hz, and every 100 Hz thereafter. As such, the move period, $T_r$, should be adjusted to $T_r=2T_n$ in order to take advantage of this notch. However, this notch is very broad compared to the sharp valleys associated with the linear ramp preshape as shown in FIG. 40. As such, it can be seen that the potential for exciting the system is greatly reduced by using the ATS preshape rather than a linear ramp preshape. The cost of the substantially improved robustness characteristics realized by using the ATS preshape function, however, is taking twice the amount of time to move one basic unit of displacement while the impulses are moved to the third derivative.

Concerning the ATC preshape shown in FIG. 38D, the impulses are moved to the fourth derivative so that the third derivative becomes square waves, while the second derivative is a continuous linear function. As such, the velocity profile is parabolic, and the shape function is cubic, hence the name ATC (i.e., $At^3$), as can be appreciated from the following equations:

$$a_1(t)=bt \text{ for } 0<t<T/4 \quad [86a]$$

$$a_2(t)=bT/4-b(t-T/4) \text{ for } T/4<t<3T/4 \quad [86b]$$

$$a_3(t)=-bT/4+b(t-3T/4) \text{ for } 3T/4<t<T \quad [86c]$$

$$v_1(t)=bt^2/2 \text{ for } 0<t<T/4 \quad [87a]$$

$$v_2(t)=bT^2/2+(bT/4)(t-T/4)-(b/2)(t-T/4)^2 \text{ for } T/4<t<3T/4 \quad [87b]$$

$$v_3(t)=bT^2/32-(bT/4)(t-3T/4)+(b/2)(t-3T/4)^2 \text{ for } 3T/4<t<T \quad [87c]$$

$$q_1(t)=bt^3/6 \text{ for } 0<t<T/4 \quad [88a]$$

$$q_2(t)=bT^3/384+(bT^2/2)(t-T/4)+(bT/8)(t-T/4)^2-(b/6)(t-T/4)^3 \text{ for } T/4<t<3T/4 \quad [88b]$$

where, a represents acceleration, b represents the jerk term, v represent velocity, and T represents the move time. The equation for the third order time function $q_3(t)$ is omitted due to its length, but is readily obtainable through integration of the velocity term $v_3(t)$ of Equation [87c].

Figure 43:
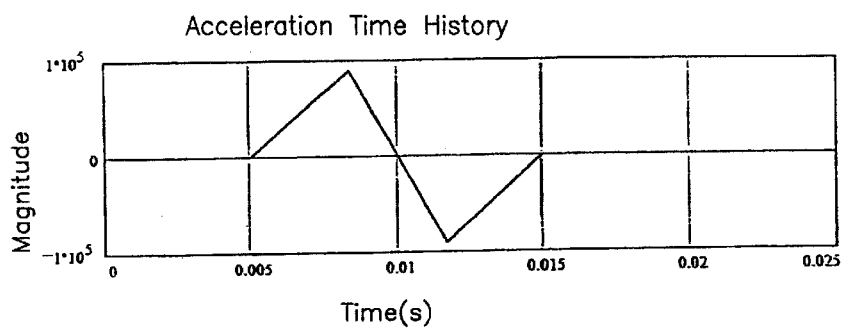
FIGS. 43–46 are various profiles and frequency spectra associated with an ATC preshape function.
Figure 44:
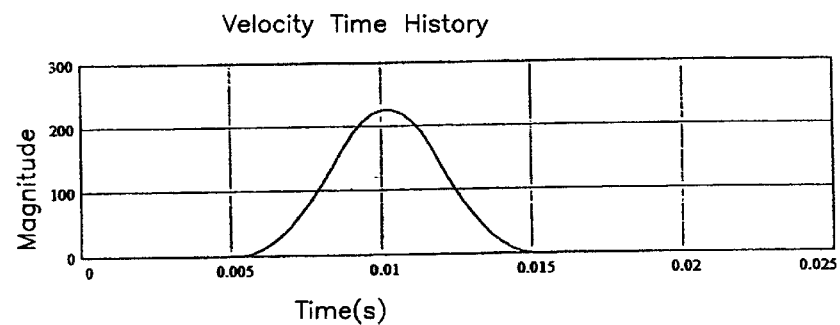
Figure 45:
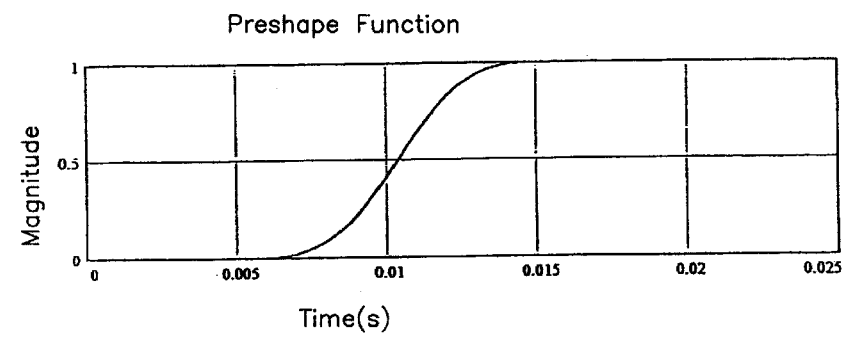

FIGS. 43–45 illustrate a computer simulation of an ATC acceleration time history, velocity time history, and preshape function, respectively, over a move time of 10 ms. The peak frequency spectral value associated with the ATC preshape is about 350 which occurs at 93 Hz. The second peak has a magnitude of approximately 30 which occurs at 450 Hz. The first zero is at 300 Hz. As such, the system will not resonate if the fundamental natural frequency is 300 Hz.

Figure 46:
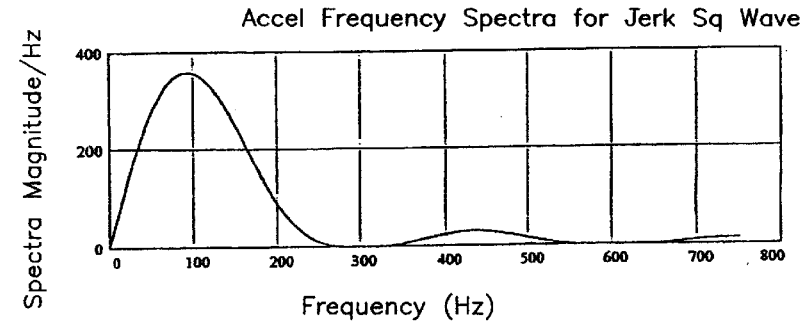

It can be seen from FIG. 46 that the ATC preshape provides for a broad and flat frequency spectra in the vicinity of 300 Hz and a significantly lower second derivative peak as compared to the ATS preshape (i.e., approximately 30 for ATC in contrast to 50 for ATS and 200 for the linear ramp). If the analysis were continued, it would be seen that the first zero occurs at frequencies such that these frequencies increase as a function of the derivative order of the impulses. Accordingly, the preshape period may be given by the following equation:

$$T_r=(\text{order}-1) \cdot T_M \quad [89]$$

where, order represents the derivative of the preshape where the impulses occur.

It can be seen from FIGS. 39–46 that robustness is related to the frequency content of the acceleration of the preshape function. Table 2 provided below demonstrates the relative robustness offered by the linear, ATS, and ATC preshape functions described above in terms of the first peak in the frequency spectra after the first notch.

TABLE 2

| Move Time ($T_r$) | Preshape Type | 2nd Peak |
|---|---|---|
| $T_n$ | Linear | 200 |
| $2T_n$ | ATS | 50 |
| $3T_n$ | ATC | 30 |

As is demonstrated in Table 2 above, the ATS and ATC preshape functions provide for significantly improved robustness characteristics (i.e., insensitivity to missing the notch frequency is greatly increased by using more move time, $T_r$) over a conventional microstepping approach which often uses a linear command input.

Figure 47:
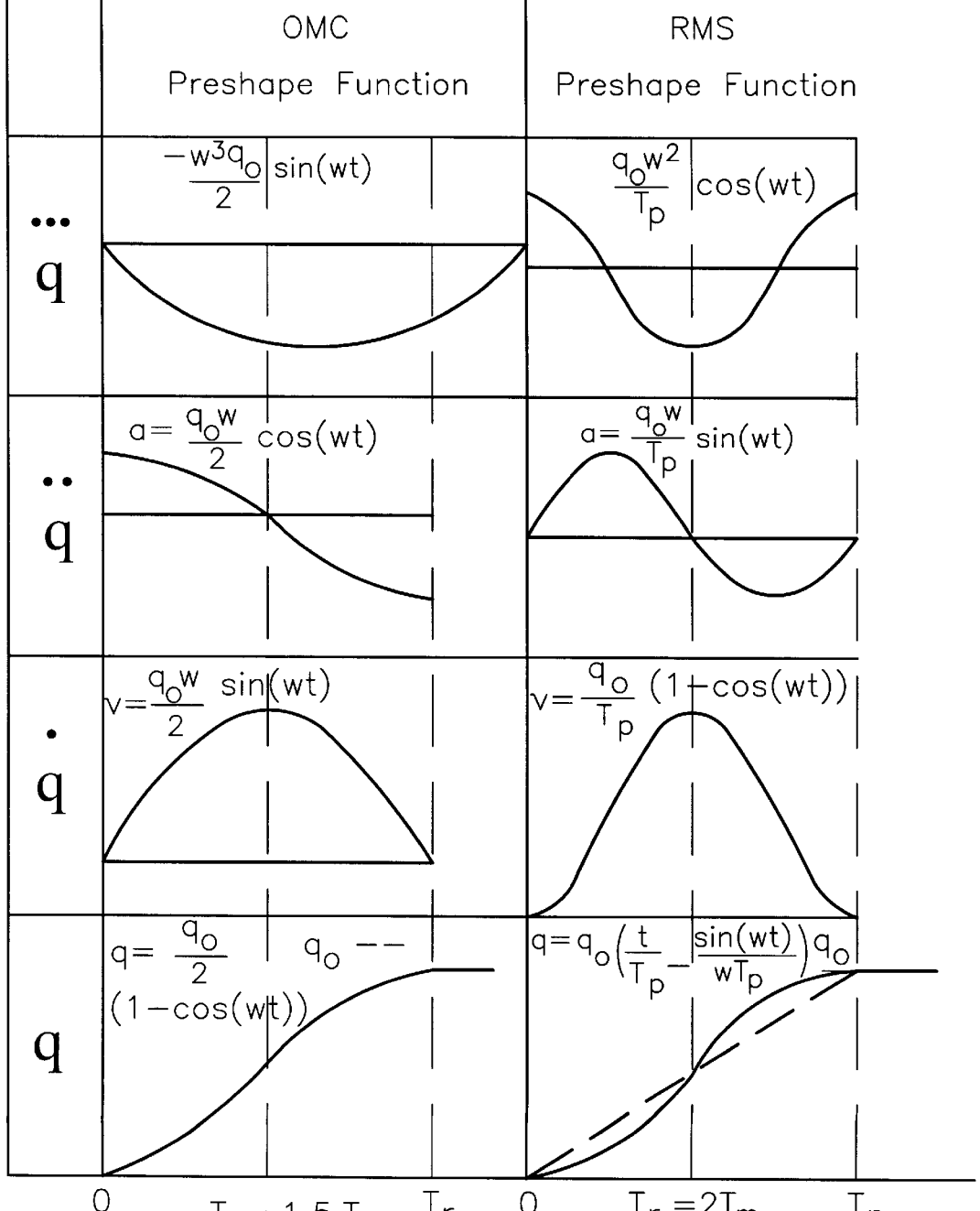
FIGS. 47A–47B graphically illustrate two trigonometric preshape functions associated with a second class of preshape functions.

The second class of preshape functions is derived from trigonometric-type functions. Two such trigonometric functions, OMC and RMS, are depicted in FIGS. 47A and 47B, respectively. Table 3 below describes the OMC and RMS trigonometric functions and their first and second time derivatives.

TABLE 3

| Theory | Parameter | Sequence |
|---|---|---|
| OMC | $a = \dfrac{q_0}{2}(1 - \cos(\omega t))$ | $\omega = \dfrac{\pi}{T_r} = \dfrac{\pi}{1.5T_n}$ |
| | $v = \dfrac{q_0 \omega}{2}\sin(\omega t)$ | |
| | $a = \dfrac{q_0 \omega^2}{2}\cos(\omega t)$ | |
| RMS | $q = q_0\left(\dfrac{t}{T_r} - \dfrac{\sin(\omega t)}{\omega T_r}\right)$ | $\omega = \dfrac{2\pi}{T_r} = \dfrac{\pi}{2.0T_n}$ |
| | $v = \dfrac{q_0}{T_r}(1 - \cos(\omega t))$ | |
| | $a = \dfrac{q_0 \omega}{T_r}\sin(\omega t)$ | |

Figure 48:
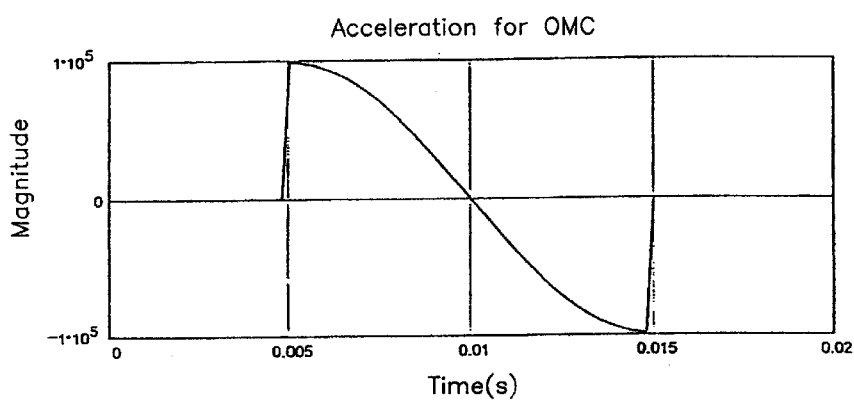
FIGS. 48–49 are graphical illustrations of the acceleration profile and frequency spectra associated with an OMC trigonometric preshape function.
Figure 49:
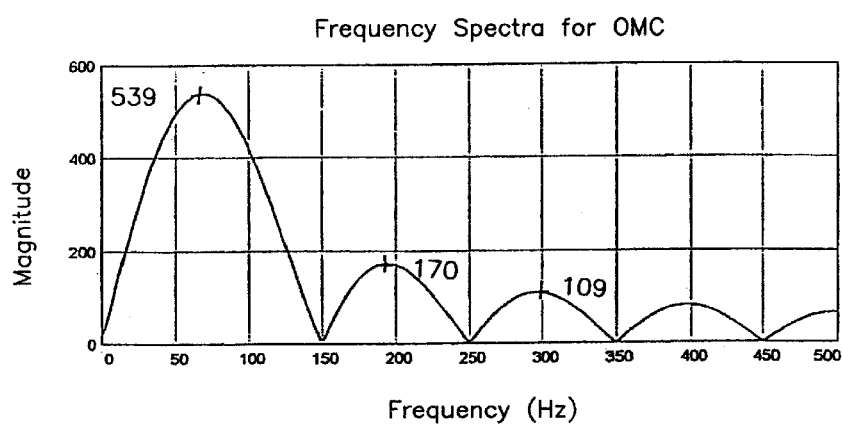

Referring to the OMC preshapes shown in FIG. 47A, a 10 ms movement of one unit is assumed in the following analysis. The acceleration time history and its spectral density are shown in FIGS. 48 and 49, respectively. The first zero occurs at 150 Hz, while other zeros occur at 100 Hz intervals above the first zero. It can be seen that the following peaks result: 539 at 68 Hz; 170 at 198 Hz; and 109 at 298 Hz. The valley or zero area is broader than that of the linear ramp, and the peaks decrease at a regular rate as compared to the linear ramp function. The first zero indicates that a move time, $T_r$, of $1.5T_n$ is required for this case.

Figure 50:
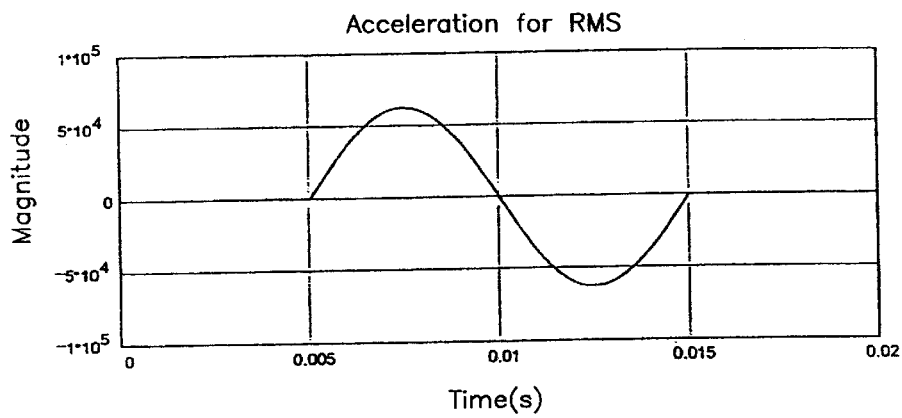
FIGS. 50–51 are graphical illustrations of the acceleration profile and frequency spectra of an RMS trigonometric preshape function.
Figure 51:
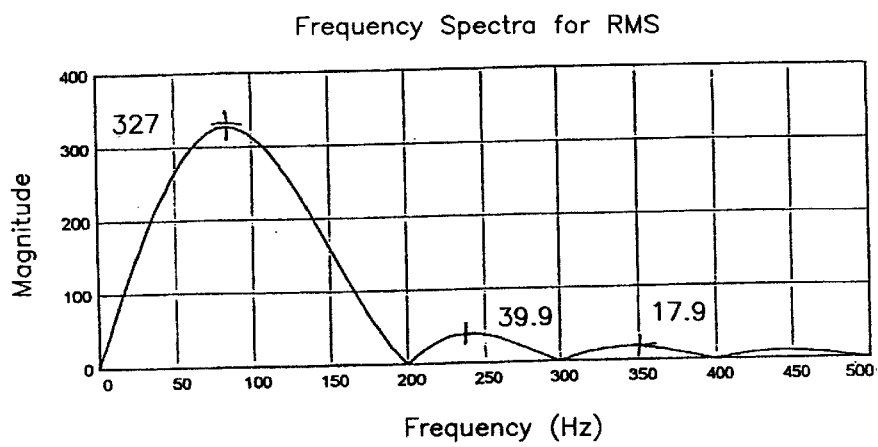

Turning to the RMS preshape shown in FIG. 47B, a 10 ms movement of one unit in the preshape is again assumed for this analysis. The acceleration time history and its spectral density are shown in FIGS. 50 and 51, respectively. The first zero occurs at 200 Hz followed by a zero at every 100 Hz interval. This results in a move time interval, $T_r$, of $2.0T_n$ for a minimal residual response. The peaks associated with the RMS preshape are shown in FIG. 51 as occurring at: 327 at 85 Hz; 39.9 at 244 Hz; and 17.98 at 352 Hz. It is apparent that the RMS preshape is superior to the OMC preshape in terms of robustness, since the second peak has a magnitude of less than one-fourth that of the OMC preshape, while the valley of the RMS preshape is much broader than that of the OMC preshape, as can be seen in FIG. 52.

Figure 52:
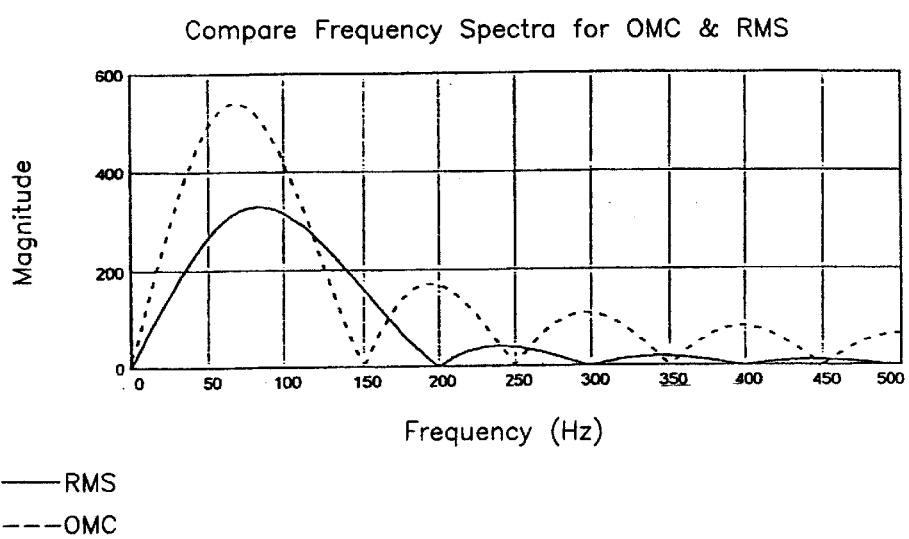
FIG. 52 is a graphical comparison between the frequency spectra of the OMC and RMS preshape functions depicted in FIGS. 49 and 51, respectively.

It can be seen from FIG. 52 that the RMS preshape is superior to the OMC preshape in terms of its potential to excite residual motion. The price paid to realize this benefit is an increase in move time from $1.5T_n$ to $2.0T_n$. A comparison of the five impulse and trigonometric preshapes described above is provided below in Table 4.

TABLE 4

| Preshape | Move Time ($T_r$) | 2nd Peak | First Zero Characteristics |
|---|---|---|---|
| Bang Bang | $0.5T_n$ | 200 | Deep and Sharp (e.g., FIG. 40) |
| ATS | $2T_n$ | 50 | Broad and Rounding (e.g., FIG. 42) |
| ATC | $3T_n$ | 30 | Very broad and Rounding |
| OMC | $1.5T_n$ | 170 | Fairly Sharp (e.g., FIG. 49) |
| RMS | $2.0T_n$ | 40 | Quite Broad and Rounding (e.g., FIG. 51) |

It is evident that a number of different preshapes may by employed when developing a motion control strategy that provides a desired balance of robustness, move time, and noise. Two very useful preshapes are the ATS and RMS preshapes previously described. Both of these preshapes require the same amount of move time (i.e., $T_r=2T_n$), both have low first peaks after the first zero, and both have a rounded valley near the zero, with ATS having a slightly rounder valley. Some improvements can be obtained by using a combination of preshape waveforms. This combination may lead to somewhat shorter values of $T_r$ and nearly the same or improved acceleration frequency spectra. The fewer discontinuities that occur in the acceleration profile (i.e., second time derivative of the preshape), the smoother the frequency spectra, the more rounder the first valley, and the more rapidly the higher frequency components drop off.

Each preshape can be optimal for a given application. For example, mechanical system parameters, such as fundamental natural frequency, are generally very consistent. In such systems, rapid motion is generally imperative and noise is of secondary concern, in which case the OMC preshape may be the desired choice. If broadband excitation is of paramount concern, then the RMS or ATC preshapes would appear to be a more attractive choice. The RMS preshape would generally be preferred over the ATC preshape in this situation due to the lower move time, $T_r$, associated with the RMS preshape. It is noted that the difference between several of the above-described preshapes is often small, so that using input preshapes beyond ATS and RMS may be negated by the limits of the digital implementation employed.

Figure 53:
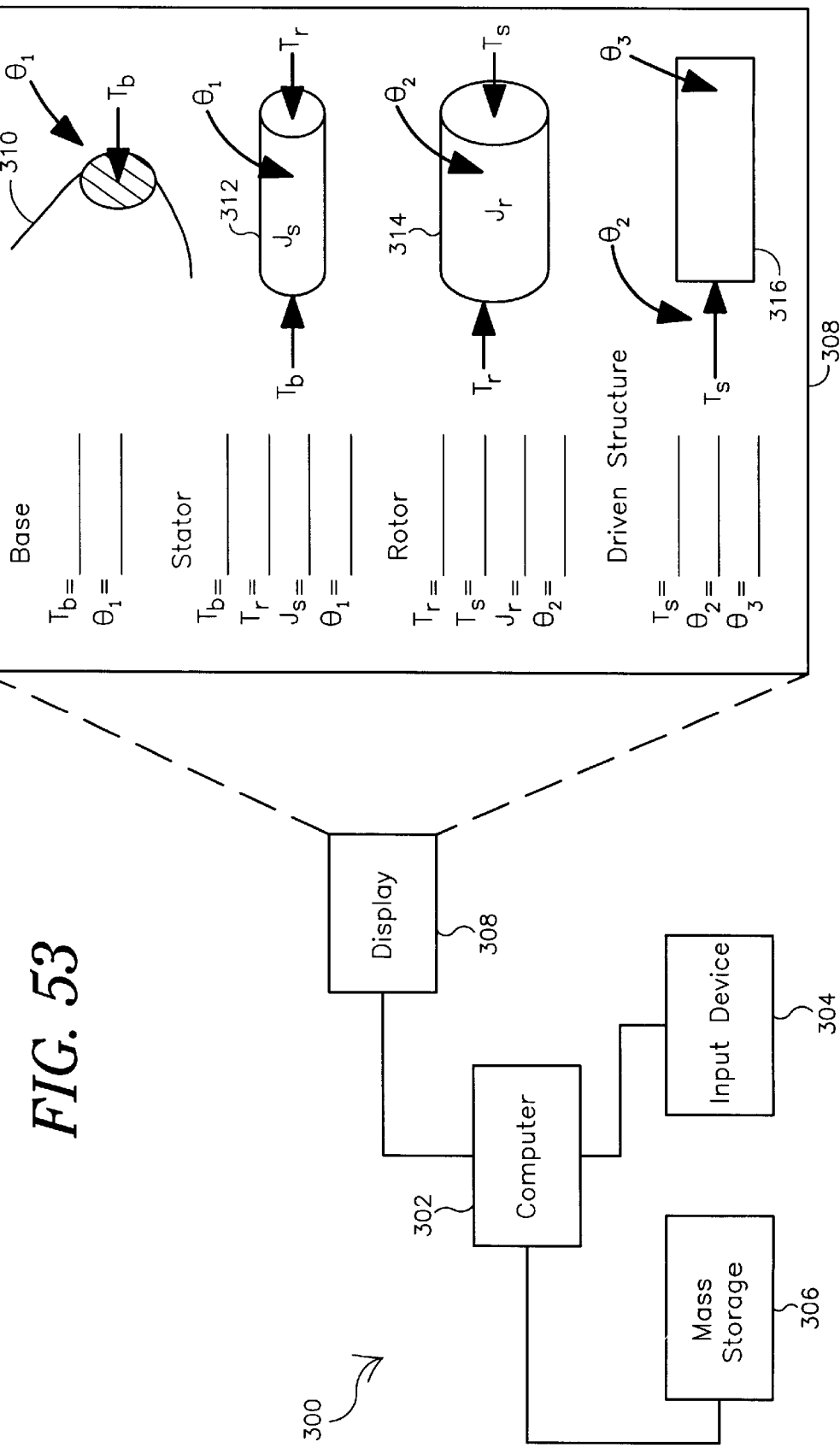
FIG. 53 is a block diagram of a computer-based design workstation for modeling a motion control system, such as one employing a stepper motor, and developing various command input functions to optimize the control strategy for the motion control system.

Referring now to FIG. 53, there is illustrated a depiction of a computer-based design workstation 300 in accordance with an embodiment of the present invention. The design workstation 300 includes a computer 302 to which an input device 304 and a mass storage device are coupled. Also coupled to the computer 302 is a display 308 which, together with the input device 304, provides an interface to facilitate user interaction with the design workstation 300. In accordance with one embodiment, design software, typically residing in a memory within the computer 302 or mass storage unit 306 (e.g., fixed disk or portable CD-ROM), implements the above-described design procedure which includes characterizing structural and dynamic parameters of individual elements of a physical system as well as system level parameters. Various command input profiles may then be developed in a manner similar to that previously described and applied to the simulated physical system. Data may then be obtained to verify the efficacy of the selected command input profile. Modifications to both the command inputs and the structural/dynamic parameters of the elements and system may also be effected in order to refine the motion control system strategy under evaluation.

By way of example, and with further reference to the embodiment shown in FIG. 53, various structural elements of a stepper motor are pictorially presented to a designer on the display 308. The structural elements defined by the designer for this particular computer modeling exercise include a base 310, stator 312, rotor 314, and the structural element subject to movement by the motor, referred to as the driven structure 316. It is understood that other structural elements and characterizing parameters may be included as part of the modeling exercise. The designer may then assign specific values to the parameters applicable to each of the base 310, stator 312, rotor 314, and driven structure 316. It is noted that the computer program may automatically calculate particular ones of the applicable characterizing parameters.

Having characterized the stepper motor elements in terms of structural and dynamic parameters, various command inputs may then be applied to the stepper motor model. The designer may modify any of the characterizing parameters or command input characteristics during the modeling exercise. System level parameters, such as move time requirements, may also be modified during the simulation. Data, such as that shown graphically in FIGS. 39–46 and 48–52, may then be obtained and plotted to quantify and verify the efficacy of a given command input and/or structural configuration.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of controlling an actuator of a motion control system, comprising:

obtaining an acceleration frequency spectra for each of a plurality of command input functions developed for moving a load a specified distance within a specified move time interval using the actuator, the frequency spectra comprising a series of peaks and notches defined between adjacent peaks;

selecting from the plurality of command input functions a command input function having a frequency spectra with a notch having a maximum width relative to frequency spectra associated with other ones of the plurality of command input functions;

applying a selected command input function to the actuator so as to cause the actuator to move the load the specified distance within the specified move time interval.

2. The method according to claim 1, wherein the motion control system exhibits a fundamental natural period, $T_n$, the selected command input function has a period of between approximately $1.5T_n$ and approximately $3T_n$.

3. The method according to claim 1, wherein the notch is one of the first five frequency notches in the respective frequency spectra.

4. The method according to claim 1, wherein the notch is the first frequency notch in the respective frequency spectra.

5. The method according to claim 1, wherein a period of the selected command input function is related to a fundamental natural frequency of the motion control system.

6. The method according to claim 1, wherein the selected command input function is characterized by a cosine function, a sine function, a parabolic function, or a cubic function.

7. The method according to claim 1, wherein the selected command input function has associated with it impulses in the third time derivative and a square wave in the second time derivative.

8. The method according to claim 1, wherein the selected command input function has associated with it impulses in the fourth time derivative and a square wave in the third time derivative.

9. The method according to claim 1, wherein an acceleration profile associated with the selected command input function is characterized by a cosine function, a sine function, a square function, or a linear function.

10. A method of developing a command input function for an actuator of a motion control system, comprising:
    developing an acceleration profile for moving a load within predetermined displacement and move time limits using the actuator, a frequency spectra of the acceleration profile having a notch, defined between adjacent peaks, the notch having a width greater than or equal to a pre-established width;
    obtaining a command input function using the acceleration profile; and
    applying the command input function to the actuator so as to cause the actuator to move the load within the predetermined displacement and move time limits.

11. The method according to claim 10, wherein the pre-established width is established as a maximum width of notches in frequency spectra associated with a plurality of acceleration profiles developed for moving the load within the predetermined displacement and move time limits.

12. The method according to claim 10, further comprising verifying that the width of the notch of the actual acceleration frequency spectra is greater than or equal to the pre-established width.

13. The method according to claim 10, wherein developing the acceleration profile further comprises selecting the predetermined displacement limit and the predetermined move time limit associated with relative movement between the load and the actuator.

14. The method according to claim 10, wherein a period of the command input function is related to a fundamental natural frequency of the motion control system.

15. The method according to claim 10, wherein the command input function is characterized by a cosine function, a sine function, a parabolic function, or a cubic function.

16. The method according to claim 10, wherein the acceleration profile for moving the load using the actuator is characterized by a cosine function, a sine function, a square function, or a linear function.

17. The method according to claim 10, wherein the command input function has associated with it impulses in the third time derivative and a square wave in the second time derivative.

18. The method according to claim 10, wherein the command input function has associated with it impulses in the fourth time derivative and a square wave in the third time derivative.

19. The method according to claim 10, wherein the motion control system exhibits a fundamental natural period, $T_n$, and the command input function has a period of between approximately $1.5T_n$ and approximately $3T_n$.

20. A method of developing a command input function for controlling a motion control system using a computer system, comprising:
    displaying a graphical representation of a base structure, a stator structure, and a rotor structure of an actuator, and a structure to be driven by the actuator;
    characterizing one or more properties of the base structure, the stator structure, the rotor structure, and the driven structure;
    obtaining an acceleration frequency spectra for each of a plurality of command input functions developed for moving the driven structure within specified displacement and move time limits using the actuator, the frequency spectra comprising a series of peaks and notches defined between adjacent peaks;
    selecting a command input function with a frequency spectra having a notch with a maximum width relative to frequency spectra associated with other ones of the plurality of command input functions;
    applying the selected command input function to the actuator; and
    simulating movement of the driven structure relative to the actuator in response to the selected command input function.

21. The method according to claim 20, further comprising verifying that the selected command input function exhibits the notch with the maximum width.

22. The method according to claim 20, further comprising:
    modifying the selected command input function;
    applying the modified selected command input function to the actuator; and
    simulating movement of the driven structure relative to the actuator in response to the modified selected command input function.

23. The method according to claim 20, wherein simulating movement of the driven structure relative to the actuator comprises simulating the movement graphically or in terms of data.

24. The method according to claim 20, further comprising modifying the displacement and move time limits.

25. The method according to claim 20, wherein characterizing one or more of the properties further comprises characterizing one or more dynamic and structural properties of the base structure, the stator structure, the rotor structure, and the driven structure.

26. The method according to claim 20, further comprising modifying one or more of the properties of the base structure, the stator structure, the rotor structure, or the driven structure.

27. The method according to claim 20, further comprising displaying a graphical representation of the frequency spectra associated with the selected command input function.

28. The method according to claim 20, further comprising displaying a graphical representation of the frequency spectra associated with one or more of the plurality of command input functions.

29. The method according to claim 20, further comprising displaying a graphical representation of position errors associated with one or more of the plurality of command input functions.

30. The method according to claim 20, further comprising displaying a graphical representation of velocity profiles associated with one or more of the plurality of command input functions.

31. The method according to claim 20, further comprising displaying a graphical representation of acceleration profiles associated with one or more of the plurality of command input functions.

32. The method according to claim 20, further comprising displaying a graphical representation of excitation time profiles associated with one or more of the plurality of command input functions.

33. A computer readable medium tangibly embodying a program executable for developing a command input function for an actuator of a motion control system, comprising:
  displaying a graphical representation of a base structure, a stator structure, and a rotor structure of the actuator, and a structure to be driven by the actuator;
  characterizing one or more properties of the base structure, the stator structure, the rotor structure, and the driven structure;
  obtaining an acceleration frequency spectra for each of a plurality of command input functions developed for moving the driven structure within specified displacement and move time limits using the actuator, the frequency spectra comprising a series of peaks and notches defined between adjacent peaks;
  selecting a command input function with a frequency spectra having a notch with a maximum width relative to frequency spectra associated with other ones of the plurality of command input functions;
  applying the selected command input function to the actuator; and
  simulating movement of the driven structure relative to the actuator in response to the selected command input function.

34. The medium according to claim 33, further comprising verifying that the selected command input function exhibits the notch with the maximum width.

35. The medium according to claim 33, further comprising modifying the selected command input function or the displacement and move time limits.

36. The medium according to claim 33, wherein characterizing one or more of properties further comprising characterizing one or more dynamic and structural properties of the base structure, the stator structure, the rotor structure, and the driven structure.

37. The medium according to claim 33, further comprising modifying one or more of the properties of the base structure, the stator structure, the rotor structure, or the driven structure.

38. The medium according to claim 33, further comprising displaying a graphical representation of the frequency spectra associated with the selected command input function.

39. The medium according to claim 33, further comprising displaying a graphical representation of the frequency spectra associated with one or more of the plurality of command input functions.

40. The medium according to claim 33, further comprising displaying a graphical representation of velocity profiles, acceleration profiles, or excitation time profiles associated with one or more of the plurality of command input functions.

41. A method of controlling an actuator of a motion control system, comprising:
  obtaining an acceleration frequency spectra for each of a plurality of command input functions developed for moving a load a specified distance within a specified move time interval using the actuator, the frequency spectra comprising a series of peaks and notches defined between adjacent peaks;
  selecting from the plurality of command input functions a command input function having a frequency spectra with a peak having a minimum magnitude relative to frequency spectra associated with other ones of the plurality of command input functions;
  applying a selected command input function to the actuator so as to cause the actuator to move the load the specified distance within the specified move time interval.

42. The method according to claim 41, wherein the motion control system exhibits a fundamental natural period, $T_n$, and the selected command input function has a period of between approximately $1.5T_n$ and approximately $3T_n$.

43. The method according to claim 41, wherein the peak with a minimum magnitude is either a first peak or a second peak in the respective frequency spectra.

44. The method according to claim 41, wherein a period of the selected command input function is related to a fundamental natural frequency of the motion control system.

45. The method according to claim 41, wherein the selected command input function is characterized by a cosine function, a sine function, a parabolic function, or a cubic function.

46. The method according to claim 41, wherein the selected command input function has associated with it impulses in the third time derivative and a square wave in the second time derivative.

47. The method according to claim 41, wherein the selected command input function has associated with it impulses in the fourth time derivative and a square wave in the third time derivative.

48. The method according to claim 41, wherein an acceleration profile associated with the selected command input function is characterized by a cosine function, a sine function, a square function, or a linear function.

49. A method of developing a command input function for an actuator of a motion control system, comprising:
  developing an acceleration profile for moving a load within predetermined displacement and move time limits using the actuator, a frequency spectra of the acceleration profile having a peak with a magnitude of less than or equal to a pre-established magnitude;
  obtaining a command input function using the acceleration profile; and
  applying the command input function to the actuator so as to cause the actuator to move the load within the predetermined displacement and move time limits.

50. The method according to claim 49, wherein the pre-established magnitude is established as a minimum magnitude of frequency spectra associated with a plurality of acceleration profiles developed for moving the load within the predetermined displacement and move time limits.

51. The method according to claim 49, further comprising verifying that the magnitude of an actual acceleration frequency spectra associated with the command input function is less than or equal to the pre-established magnitude.

52. The method according to claim 49, wherein developing the acceleration profile further comprises selecting the predetermined displacement limit and the predetermined move time limit associated with relative movement between the load and the actuator.

53. The method according to claim 49, wherein a period of the command input function is related to a fundamental natural frequency of the motion control system.

54. The method according to claim 49, wherein the command input function is characterized by a cosine function, a sine function, a parabolic function, or a cubic function.

55. The method according to claim 49, wherein the acceleration profile for moving the load using the actuator is characterized by a cosine function, a sine function, a square function, or a linear function.

56. The method according to claim 49, wherein the command input function has associated with it impulses in the third time derivative and a square wave in the second time derivative.

57. The method according to claim 49, wherein the command input function has associated with it impulses in the fourth time derivative and a square wave in the third time derivative.

58. The method according to claim 49, wherein the motion control system exhibits a fundamental natural period, $T_n$, and the command input function has a period of between approximately $1.5T_n$ and approximately $3T_n$.

59. A method of developing a command input function for controlling a motion control system using a computer system, comprising:
   displaying a graphical representation of a base structure, a stator structure, and a rotor structure of an actuator, and a structure to be driven by the actuator;
   characterizing one or more properties of the base structure, the stator structure, the rotor structure, and the driven structure;
   obtaining an acceleration frequency spectra for each of a plurality of command input functions developed for moving the driven structure within specified displacement and move time limits using the actuator, the frequency spectra comprising a series of peaks and notches defined between adjacent peaks;
   selecting a command input function with a frequency spectra having a peak with a minimum magnitude relative to frequency spectra associated with other ones of the plurality of command input functions;
   applying the selected command input function to the actuator; and
   simulating movement of the driven structure relative to the actuator in response to the selected command input function.

60. The method according to claim 59, further comprising verifying that the selected command input function exhibits the peak with the minimum magnitude.

61. The method according to claim 59, further comprising:
   modifying the selected command input function;
   applying the modified selected command input function to the actuator; and
   simulating movement of the driven structure relative to the actuator in response to the modified selected command input function.

62. The method according to claim 59, wherein simulating movement of the driven structure relative to the actuator comprises simulating the movement graphically or in terms of data.

63. The method according to claim 59, further comprising modifying the displacement and move time limits.

64. The method according to claim 59, wherein characterizing one or more of the properties further comprises characterizing one or more dynamic and structural properties of the base structure, the stator structure, the rotor structure, and the driven structure.

65. The method according to claim 59, further comprising modifying one or more of the properties of the base structure, the stator structure, the rotor structure, or the driven structure.

66. The method according to claim 59, further comprising displaying a graphical representation of the frequency spectra associated with the selected command input function.

67. The method according to claim 59, further comprising displaying a graphical representation of the frequency spectra associated with one or more of the plurality of command input functions.

68. The method according to claim 59, further comprising displaying a graphical representation of position errors associated with one or more of the plurality of command input functions.

69. The method according to claim 59, further comprising displaying a graphical representation of velocity profiles associated with one or more of the plurality of command input functions.

70. The method according to claim 59, further comprising displaying a graphical representation of acceleration profiles associated with one or more of the plurality of command input functions.

71. The method according to claim 59, further comprising displaying a graphical representation of excitation time profiles associated with one or more of the plurality of command input functions.

72. A computer readable medium tangibly embodying a program executable for developing a command input function for an actuator of a motion control system, comprising:
   displaying a graphical representation of a base structure, a stator structure, and a rotor structure of the actuator, and a structure to be driven by the actuator;
   characterizing one or more properties of the base structure, the stator structure, the rotor structure, and the driven structure;
   obtaining an acceleration frequency spectra for each of a plurality of command input functions developed for moving the driven structure within specified displacement and move time limits using the actuator, the frequency spectra comprising a series of peaks and notches defined between adjacent peaks;
   selecting a command input function with a frequency spectra having a peak with a minimum magnitude relative to frequency spectra associated with other ones of the plurality of command input functions;
   applying the selected command input function to the actuator; and
   simulating movement of the driven structure relative to the actuator in response to the selected command input function.

73. The medium according to claim 71, further comprising verifying that the selected command input function exhibits the peak with the minimum magnitude.

74. The medium according to claim 71, further comprising modifying the selected command input function or the displacement and move time limits.

75. The medium according to claim 71, wherein characterizing one or more of properties further comprising characterizing one or more dynamic and structural properties of the base structure, the stator structure, the rotor structure, and the driven structure.

76. The medium according to claim 71, further comprising modifying one or more of the properties of the base structure, the stator structure, the rotor structure, or the driven structure.

77. The medium according to claim 71, further comprising displaying a graphical representation of the frequency spectra associated with the selected command input function.

78. The medium according to claim 71, further comprising displaying a graphical representation of the frequency spectra associated with one or more of the plurality of command input functions.

79. The medium according to claim 71, further comprising displaying a graphical representation of velocity profiles, acceleration profiles, or excitation time profiles associated with one or more of the plurality of command input functions.

* * * * *

UNITED STATES PATENT AND TRADEMARK OFFICE
CERTIFICATE OF CORRECTION

PATENT NO. : 6,294,891 B1
DATED : September 25, 2001
INVENTOR(S) : McConnell et al.

Page 1 of 1

It is certified that error appears in the above-identified patent and that said Letters Patent is hereby corrected as shown below:

Column 21,
Line 43, please delete "$K\theta_d - \lambda\sin(r\theta) \approx K\theta_t = J[\backslash\$]\$\bar{}g\ddot{v} + c\dot{\theta} + K\theta$"
and insert -- $K\theta_d - \lambda\sin(r\theta) \approx K\theta_t = J\ddot{\theta} + c\dot{\theta} + K\theta$ --;

Column 27,
Line 17, please delete "$Js^2\theta_2 = J[\backslash\$]\$\bar{}g\ddot{v}_2$" and insert -- $Js^2\theta_2 = J\ddot{\theta}_2$ --.

Signed and Sealed this

Twelfth Day of March, 2002

Attest:

JAMES E. ROGAN
*Attesting Officer*   *Director of the United States Patent and Trademark Office*